United States Patent
Linker

(10) Patent No.: US 8,117,022 B2
(45) Date of Patent: Feb. 14, 2012

(54) METHOD AND SYSTEM FOR MACHINE UNDERSTANDING, KNOWLEDGE, AND CONVERSATION

(76) Inventor: Sheldon O. Linker, Irvine, CA (US)

(*) Notice: Subject to any disclaimer, the term of this patent is extended or adjusted under 35 U.S.C. 154(b) by 0 days.

(21) Appl. No.: 11/952,796

(22) Filed: Dec. 7, 2007

(65) Prior Publication Data

US 2008/0140387 A1    Jun. 12, 2008

Related U.S. Application Data

(60) Provisional application No. 60/869,020, filed on Dec. 7, 2006, provisional application No. 61/012,252, filed on Dec. 7, 2007.

(51) Int. Cl.
*G06F 17/27* (2006.01)
(52) U.S. Cl. .................. 704/9; 704/1; 704/10
(58) Field of Classification Search .......... 704/1, 9, 704/10, 46
See application file for complete search history.

(56) References Cited

U.S. PATENT DOCUMENTS

| | | | | |
|---|---|---|---|---|
| 4,853,873 | A * | 8/1989 | Tsuji et al. ............. | 706/59 |
| 5,806,060 | A * | 9/1998 | Borgida et al. ........... | 707/3 |
| 6,356,886 | B1 * | 3/2002 | Doyle ................. | 706/46 |
| 6,484,155 | B1 * | 11/2002 | Kiss et al. ............. | 706/46 |
| 6,701,294 | B1 * | 3/2004 | Ball et al. ............. | 704/257 |
| 6,757,672 | B2 * | 6/2004 | Bird et al. ............. | 707/3 |
| 6,961,705 | B2 * | 11/2005 | Aoyagi et al. ........... | 704/275 |
| 7,216,073 | B2 * | 5/2007 | Lavi et al. ............. | 704/9 |
| 7,225,128 | B2 * | 5/2007 | Kim et al. ............. | 704/257 |
| 7,243,069 | B2 * | 7/2007 | Jaepel et al. ........... | 704/235 |
| 7,266,535 | B1 * | 9/2007 | Nelken et al. ........... | 706/46 |
| 7,266,547 | B2 * | 9/2007 | Bao et al. ............. | 707/3 |
| 7,305,372 | B2 * | 12/2007 | Bridges et al. .......... | 706/45 |
| 2001/0053968 | A1 * | 12/2001 | Galitsky et al. ......... | 704/9 |
| 2002/0023144 | A1 * | 2/2002 | Linyard et al. .......... | 709/218 |
| 2002/0038213 | A1 * | 3/2002 | Adachi ............... | 704/257 |
| 2004/0024720 | A1 * | 2/2004 | Fairweather ............ | 706/46 |
| 2005/0154691 | A1 * | 7/2005 | Higgins et al. .......... | 706/46 |
| 2006/0247983 | A1 * | 11/2006 | Dalli ................. | 705/27 |
| 2007/0055656 | A1 * | 3/2007 | Tunstall-Pedoe ......... | 707/3 |
| 2007/0112714 | A1 * | 5/2007 | Fairweather ............ | 706/46 |
| 2007/0192085 | A1 * | 8/2007 | Roulland et al. ......... | 704/9 |

OTHER PUBLICATIONS

Gorertzel, Ben, "Potential Computational Linguistics Resources for Lojban" Mar. 6, 2005 http://goertzel.org/new_research/lojban_AI.pdf first available Sep. 30, 2005.*

* cited by examiner

*Primary Examiner* — Douglas Godbold
(74) *Attorney, Agent, or Firm* — Julio M. Loza; Loza & Loza, LLP

(57) ABSTRACT

A system for storing knowledge in a speakable, formal class of languages and allowing querying and retrieving of that knowledge is provided. The system further allows the users to input data, instructions, questions, and queries without structure or rules over and above the actual grammar of the class of languages. The system responds in words, phrases or complete sentences as applicable, and its output is bound by the rules of logic, rather than simple correlation or likely meaning.

18 Claims, 21 Drawing Sheets

METHOD AND SYSTEM FOR MACHINE UNDERSTANDING, KNOWLEDGE, AND CONVERSATION

CLAIM OF PRIORITY UNDER 35 U.S.C. §119

The present Utility Application for patent claims priority to U.S. Provisional Application No. 60/869,020 entitled "Method and System for Machine Understanding, Knowledge, and Conversation" filed Dec. 7, 2006, and also claims priority to U.S. Provisional Application No. 61/012,252 entitled "Intelligent Conversation with a Machine Using a Loglan/English Pidgin" filed Dec. 7, 2007, and are both hereby expressly incorporated by reference herein.

FIELD

The present invention relates to the fields of Artificial Intelligence (also known as Machine Intelligence) and to Knowledge Bases (which are related to Data Bases), and more specifically to knowledge bases integrated into a control program, which in the case of the present invention, may deliver knowledge from and learn new knowledge into the knowledge base.

BACKGROUND

Current computer systems generally store knowledge in a database, where said knowledge is often stored as data and said data is laid out in (in decreasing scope) databases, schemata, tables, records, objects, and fields, as collections of documents in tabular form (such as in a spreadsheet or array), or in a form designed by the author of a computer application program. Such data storage structure is typically designed by a person or another program acting on original instructions from a person. The collections of documents may be indexed, for example, according to search rules, with a program to respond to search queries, returning a list of results in some order, such as most-likely-useful-to-least.

These prior art computer systems do not allow data and instructions to be presented without instruction or design, and to be acted upon. Existing systems such as Eliza (see http://en.wikipedia.org/wiki/ELIZA) and Parry (see http://en.wikipedia.org/wiki/PARRY) also emulate such a system by pretending to understand what is said to them, but do not actually understand what is being said or what they are saying.

Therefore there is a need for a computer to act as a conversational, free-form, intelligent repository of knowledge, able to accept general statements and questions, and to respond in kind, without regard to any sort of script or limitation on subject or complexity.

SUMMARY OF THE PRESENT INVENTION

A method is provided for processing a language, comprising: (a) inputting data in a formal, speakable language; (b) parsing the input data into an internal format in such a way that a memory of an original grammar structure present in the input data is retained; (c) comparing the parsed input data with previously stored data in a data/knowledge base to prove, disprove or determine if the parsed data is plausible; and/or (d) storing results of the evaluation in the data/knowledge base. The speakable language may be understood by speakers of a corresponding natural language. The input data may be at least one word of text or speech. Inputting the data in a formal, speakable language and parsing the input data into an internal format may include (a) receiving the input data in a formal, spoken or written language; and (b) translating the data into an internal data structure. The formal, speakable language may be at least one of a Loglan-compatible, Lojban-compatible language structure, or any other speakable formal language structure. The input data may include one or more utterances including at least one or sounds, words, movement, symbols, or abstraction. The one or more utterances may be verbal, written, signed, referenced, imagined or picked up by an electronic sensing apparatus. The method may further include comparing a first utterance to a second utterance, where the first utterance has a higher level of specificity than the second utterance, to determine if the second utterance is superfluous.

The method may also include (a) determining whether the input data is a command, a statement of fact, or a question, (b) discarding the input data if the input data is a statement known to be true or false, wherein the statement is added based upon rules of possibility, conjunctions, implications, and disjunctions. The formal language may include a grammar structure defined by: (a) a first characteristic to form predications and statements; (b) a second characteristic to form questions and queries; (c) a third characteristic to apply modifiers to portions of the text; and/or (d) a fourth characteristic ability to apply a broad category of tenses to portions of the text.

The method may further include (a) retaining the input data if the input data is a statement which provides new information to the data/knowledge base and adding the statement to the data/knowledge base, (b) formulating an answer if the input data is a question or query, (c) retrieving selected data stored in the data/knowledge base in response to a question, and/or (d) formatting the selected data into an original natural language for output. The selected data may be formatted into a natural or artificial language for output in response to the question based on stored data in the data/knowledge base.

A device is also provided for processing a language selected by a user, comprising: (a) an input module for receiving input data in the form of utterances in a formal, speakable language; (b) a parsing module for parsing the input data from the input module into an internal format; (c) a prover module for receiving the formatted input data from the parse module and comparing the parsed input data with previously stored data in a data/knowledge base to prove, disprove or determine if the parsed data is plausible; and/or (d) storing results of the prover module in the data/knowledge base. The comparison either: proves the statements, disproves the statements or shows that the statements are plausible and saves in the data/knowledge base. The data may be formatted into at least one of a natural or artificial language for output in response to a question based on knowledge data found with the data/knowledge base.

Consequently, a device is provided for processing a language selected by a user, comprising: (a) means for receiving data in the form of utterances in a formal, speakable language; (b) means for parsing the data into an internal format; (c) means for comparing the parsed input data with previously stored data in a data/knowledge base to prove, disprove or determine if the parsed data is plausible; and/or (d) means for storing the results of the comparison in the data/knowledge base.

The foregoing, together with other features and advantages of the present invention, will become more apparent when referring to the following specification, claims and accompanying drawings.

BRIEF DESCRIPTION OF THE DRAWINGS

Various features of the present invention will be better understood from the following detailed description of an exemplary embodiment of the invention, taken in conjunction with the accompanying drawings in which like reference numerals refer to like parts.

DETAILED DESCRIPTION OF THE INVENTION

Figure 1:
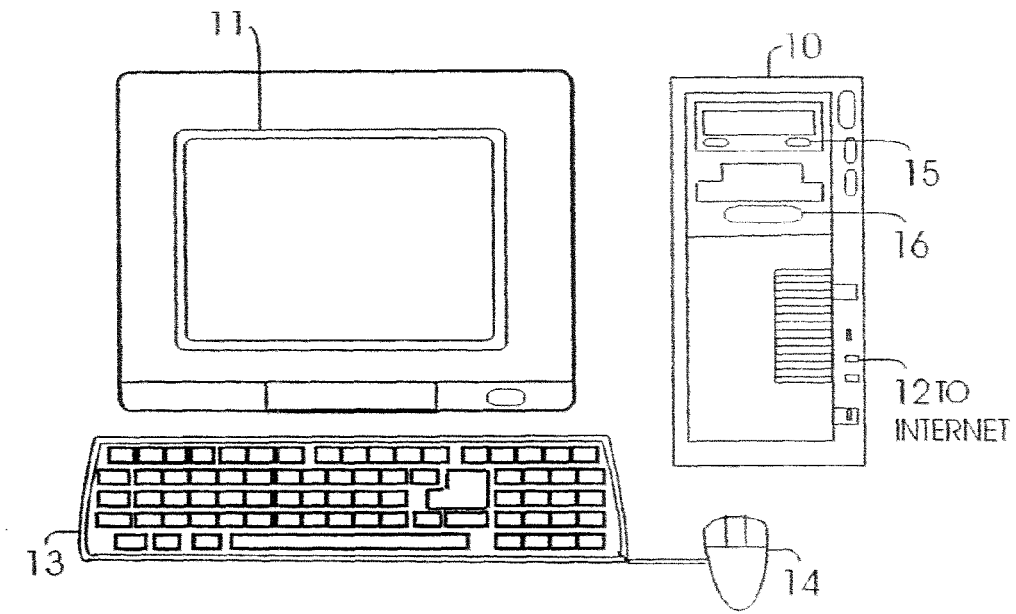
FIG. 1 is a block diagram of a computing system for executing computer executable process steps according to one embodiment of the invention.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

In the following description, certain terminology may be used to describe certain features of one or more embodiments of the invention. The term "Garbage collection" refers to methods of lessening memory load. The term "formal language" refers to a language in which the grammar is precisely defined, usually through a symbolic language-definition language, such as Backus-Naer Form (BNF, see http://en.wikipedia.org/wiki/Backus-Naur_form).

General Overview

One aspect of the present invention may overcome the problems discussed above by disclosing how a natural language, such as English, may be combined with a formal, speakable language to form a new, hybrid language which is speakable and usable by speakers of any given natural language, and which has all the properties of a formal language. One example of such "formal language" includes Loglan, first disclosed in *Scientific American*, June, 1960, pages 53-63, with a true formal grammar first disclosed in *La Loglantan*, June 1980, pages 21-32.

Another aspect of the present invention discloses how a program, computer, device, network, or similar artifice may understand and/or converse in such a language, including but not limited to acting as (i) a knowledge base system requiring no programming, (ii) a database system requiring neither schemata nor programming, (iii) a theorem prover requiring no programming, and/or (iv) to other uses envisaged by various fiction and nonfiction authors. Note that although a specific formal, speakable language is used for purposes of example and illustration, the techniques disclosed herein may be implemented with a large class of languages, covering a vast plurality of styles, base natural languages, and base formal, speakable languages. Such languages can be used for normal human discourse and/or communications, but unlike natural languages, are unambiguous.

Such formal, speakable languages may be used to allow software applications, computers, machines, and/or a combination thereof, to mimic the operation of natural language. The lack of ambiguity in the class of formal, speakable languages described above means that a method or system processing and/or understanding such formal, speakable language need not score its results or attempt to assign a best or most likely meaning, as there is always exactly one meaning to any statement, question, or query. By way of example, the following is a sample conversation between a user and a computer:

User: either say "streak" 'meow' or say "streak" 'woof'
Computer: This information is being saved.
User: say "streak" either 'meow' or 'woof'.
Computer: This was already known.
User: cat "streak"
Computer: This information is being saved.
User: dog "fido"
Computer: This information is being saved.
User: cat what
Computer: "streak"
User: dog which
Computer: "fido"
User: blank "streak"
Computer: *cat "streak"/
User: blank "nemo"
Computer: I don't have the answer to that question.

In the present invention, a user may use a logical language, such as Loglan, Lojban (see http://www.lojban.org/tiki/tiki-index.php?page=Home+Page&bl&bl=y), or any other unambiguous language, either currently in existence, or which might come into existence at some future point, with a fully known grammar, or any "functional derivation" of such a language may be used to achieve unambiguous parsing and unambiguous word meaning, which in turn may be used to achieve understanding of what was entered or transmitted, both on the part of human listeners or readers, and machine understanding of what was said or sent, which in turn may be used to achieve automatic data storage and retrieval, automatic knowledge storage and retrieval, and human-machine conversation without the need for additional programming.

Such a system can serve a variety of users, at a variety of privilege levels and veracity levels. The system may evaluate the utterance, and for each statement, decide whether the information presented is worth storing, and if so, how. Imperatives may be executed or taken under advisement. Queries and questions (distinction to be shown below) will be answered in the proper context, if answerable. The responses from the system to the user can be in functional forms, constructed languages, or any natural language, given a formatting function for the target language.

At least one implementation of the system may range from dedicated, embedded system, to wide-area-networked distributed and shared data. Some instantiations may include a wenear, shell or "skin" language and/or graphical user interface, to map one language into another, and/or to provide the user(s) a more pleasant use experience.

The present invention provides a method and system for machine understanding of text, retention of knowledge and conversation. The system can be implemented in software and executed by a computing system. To facilitate an understanding of the preferred embodiment, the general architecture and operation of a computing system is described along with examples of specific processes. In contrast to existing and prior art systems that use pattern matching and probabilities, one aspect of the present invention uses an unambiguous, formal grammar in which all rules are well-defined, and thus stores and compares concepts, without the need for pattern matching or probabilities.

Epistemology and Proofs

Statements are evaluated against one another using an expansion of Boolean logic. In standard Boolean logic, the "and" operation is defined as follows: "True and True=True; False and True=False; True and False=False; False and False=False". However, in the present invention, the "and" operation may also include, in addition to the standard logic, "True and Possible=Possible; False and Possible=False; Possible and Possible=Possible; Possible and True=Possible; Possible and False=False". If, given a knowledge base and a new statement, one embodiment handles statements, in the single-user case, as follows: (a) If the knowledge base shows that the new statement is true or superfluous, then the new statement is discarded, with or without comment, as it imparts no new knowledge; (b) If the knowledge base shows that the new statement is false, then the new statement is rejected. In the present invention, an error message or a counter-claim, stating the actual fact, or series of facts which leads to the rejection will be issued; (c) If the knowledge base shows that the new statement is plausible, then the new statement may be stored as knowledge; and (d) At any time, the system may search for items which are now superfluous, and delete them without effect on knowledge.

If there are multiple users, or trusted and untrusted user modes are used, (set up using commands or with statements, such as "I don't trust Bob"), refinements and plausible statements of trusted users may be added as descsribed above. In this multi-class embodiment, new knowledge may be added in the form: "User-name claims 'statement'.", for example, "Sheldon claims 'Streak is a cat'." Where these multiple trust-level classes of users exist, trusted users may override or degrade previous statements of trusted users. For example, if the knowledge base contains a statement by Untrusted User Sheldon: "Streak is a cat." and Trusted User Bob makes the statement: "Streak is not a cat." then the knowledge base may be left as: "Streak is not a cat." or "Streak is not a cat, and Sheldon claims 'Streak is a cat'." In one embodiment, a user may be held to trust himself or herself more than others, so that statements made by the current user are not as trusted as Trusted Users, but are more trusted than the statements of other untrusted users. Users may also be assigned various trust levels. The assignment of trust levels to various users can be done in any of a variety of ways. For instance, an embodiment could use statements (I don't trust Bob) or commands (Trust Bob to level 0.5).

If there are multiple users, or trusted and untrusted user modes are used, (set up using commands or with statements, such as "I don't trust Bob"), refinements and plausible statements of trusted users may be added as descsribed above. In this multi-class embodiment, new knowledge may be added in the form: "User-name claims 'statement'.", for example, "Sheldon claims 'Streak is a cat'." Where these multiple trust-level classes of users exist, trusted users may override or degrade previous statements of trusted users. For example, if the knowledge base contains a statement by Untrusted User Sheldon: "Streak is a cat." and Trusted User Bob makes the statement: "Streak is not a cat." then the knowledge base may be left as: "Streak is not a cat." or "Streak is not a cat, and Sheldon claims 'Streak is a cat'." In one embodiment, a user may be held to trust himself or herself more than others, so that statements made by the current user are not as trusted as Trusted Users, but are more trusted than the statements of other untrusted users. Users may also be assigned various trust levels. The assignment of trust levels to various users can be done in any of a variety of ways. For instance, an embodiment could use statements (I don't trust Bob) or commands (Trust Bob to level 0.5).

In Boolean logic, two statements may be compared on a one-to-one logical basis. In the present invention, two statements, also known as predications, may be compared on a one-to-one basis, or on the basis of basic meanings, but with added logic states.

Tables 1 and 2 illustrate expansion of "AND" and "OR" logic, respectively, to include "Plausible" results (shaded in the tables) in addition to "True" and "False", not present in standard Boolean logic. As can be seen from Table 1 (AND), if one statement is "True" while a second statement is "False", then the predication is "False". As can be seen from Table 2 (OR), if one statement is "True" while a second statement is "False", then the predication is "True".

TABLE 1

| AND | True | False | Possible |
| --- | --- | --- | --- |
| True | True | False | Possible |
| False | False | False | False |
| Possible | Possible | False | Possible |

TABLE 2

| OR | True | False | Possible |
| --- | --- | --- | --- |
| True | True | True | True |
| False | True | False | Possible |
| Possible | True | Possible | Possible |

If the knowledge base contents include "Streak is a cat.", direct matching examples may include (a) "Streak is a cat." (True), and (b) "Streak is not a cat." (False). Alternatively, "It is not the case that Streak is a cat."

The "base meaning" of a sentence or fact is any meaning which can be derived from a sentence by simplifying it. Examples of base meaning comparisons will be shown using a knowledge base containing: "Streak is a female cat." Base meaning examples include: (a) "Streak is a female." (True, because a base meaning of the original sentence is this sentence); (b) "Streak is a cat.", (True, for the same reason); and (c) "Streak is a nice female cat." (Refinement, because the original sentence is a base meaning of this one). Such comparisons can be made by dropping an adjectival phrase. For instance, in "Streak is a female cat." the adjectival phrase is the single adjective word "female". Thus, the base statement here is: "Streak is a cat."

Syntactic Elements

Utterances may also be or contain questions and queries. In the present invention, "question" may mean a question which is answerable by a complete sentence, to fill in a blank, and "query" may mean a question having a yes-or-no answer. Questions are handled by comparing the question to the knowledge base. Rather than being True or False (or other such results), questions result in Answerable or Unanswerable states. A question is answerable if there is a matching statement, or if there is a matching statement that can be constructed from the knowledge on hand, and if the question is not a part of a logical construct that might depend on the question. For example, Given the knowledge: "Streak is a cat.", then the questions: (a) "_ is a cat?", (b) "Streak _ a cat?", (c) "Streak is _ cat?", and (d) "Streak is a _?" may all be answered with the statement residing in the knowledge base. Similar to the logic rules for "and", additional logic states may be required for questions. For example, True & Answerable yields Answerable. Refinement & Answerable yields Unanswerable.

A query is a question posed as a statement, with a question indicator. For example, "Is Streak a cat?". Answers to queries, may include True, False, or Plausible. Alternatively, responses of the following forms may be made: (a) "Streak is a cat.", (b) "Streak is not a cat.", (c) "Streak may be a cat." Yet a third type of embodiment would have answers of the form (a) "Streak is a cat.", (b) "It is not the case that Streak is a cat.", or (c) "It is possible that Streak is a cat." When there are several "classes of veracity" or "user trust levels", represented internally as numbers, answers may include: "Streak is not a cat, and Sheldon claims 'Streak is a cat'." or "Bob claims 'Streak is not a cat', and Sheldon claims 'Streak is a cat'."

Computing System (High-Level Description)

FIG. 1 is a block diagram of a computing system for executing computer executable process steps according to one embodiment of the disclosure. FIG. 1 includes a host computer 10 and a monitor/display 11. The monitor 11 may be a CRT type, an LCD type, or any other type of color or monochrome display. Also provided with the computer 10 is a keyboard 13 for entering text data and user commands, and a pointing device 14 (such as a mouse) for processing objects displayed on the monitor 11.

The computer 10 may include a computer-readable memory medium such as a rotating disk 15 for storing readable data. Besides other programs, the disk 15 can store application programs including web browsers by which the computer 10 connects to the Internet and the systems described below, according to one aspect of the disclosure.

The computer 10 can also access a computer-readable floppy disk storing data files, application program files, and computer executable process steps embodying the disclosure or the like via a floppy disk drive 16.

A modem, an integrated services digital network (ISDN) connection, or the like may also provide the computer 10 with a DSL/Cable/satellite connection (or Internet connection) 12 to the World Wide Web ("WWW"). An Internet connection 12 may be used to allow the computer 10 to download data files, audio files, application program files and computer-executable process steps embodying the disclosure.

Figure 2:
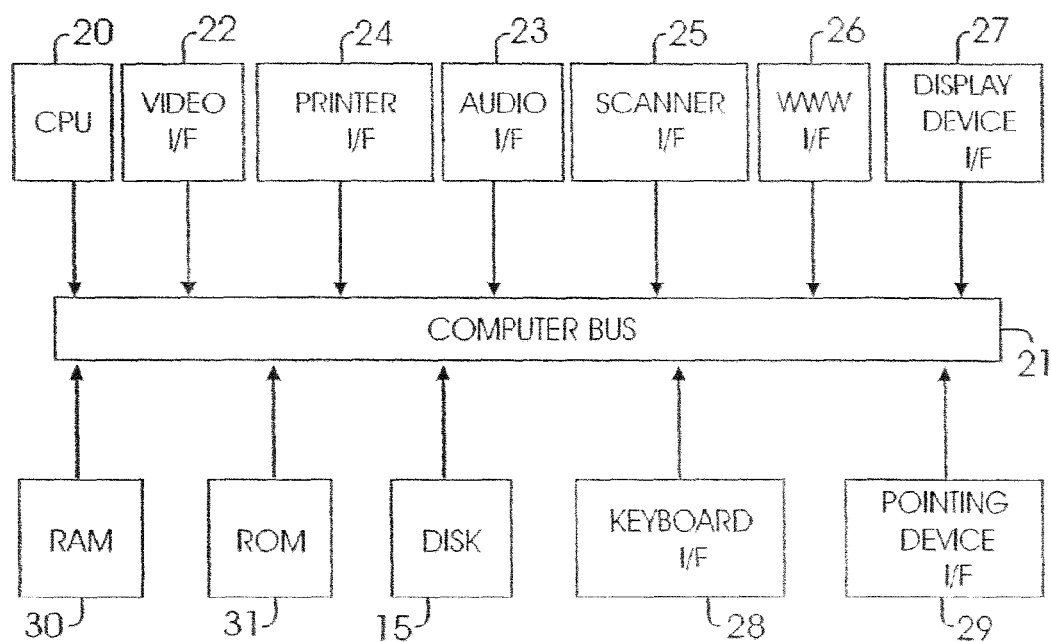
FIG. 2 is a block diagram illustrating one example of the internal functional architecture of the computing system in FIG. 1.

FIG. 2 is a block diagram showing the internal functional architecture of the computer 10. As shown in FIG. 2, the computer 10 may include a central processing unit (CPU) 20 for executing computer-executable process steps and interfaces with a computer bus 21. Also shown in FIG. 2 are a WWW interface 26, a display device interface 27, a keyboard interface 28, a pointing device interface 29, an audio interface 23, a scanner interface 25, a printer interface 24, a video interface 22, and a rotating disk 15. The scanner interface 25 can connect to a check scanner or imager (not shown) and a fingerprint scanner (not shown).

As described above, the disk 15 may store operating system program files, application program files, web browsers, and other files. Some of these files may be stored on the disk 15 using an installation program. For example, the CPU 20 may execute computer-executable process steps of an installation program so that the CPU 20 can properly execute the application program.

A random access main memory ("RAM") 30 may also interface to the computer bus 21 to provide the CPU 20 with access to memory storage. When executing stored computer-executable process steps from the disk 15 (or other storage media such as the floppy disk 16, shown in FIG. 1, or the WWW connection 12, shown in FIG. 1), the CPU 20 stores and executes the process steps out of the RAM 30.

Read only memory ("ROM") 31 may be provided to store invariant instruction sequences such as start-up instruction sequences or basic input/output operating system (BIOS) sequences for operation of the keyboard 13.

Veracity

In any system which takes in data, and gives results, one must avoid the Garbage In, Garbage Out syndrome. Data base systems typically do this by having trusted users, untrusted users, and excluded users. Trusted users are allowed to write data into the system, update it, and remove it. Untrusted users can only query the system. In a system of this type, those categories are insufficient to a multi-user system. Many times, one hears of one person's reality versus another's. If nothing else, Einstein proposed that the truth, under certain circumstances, can be relative (in that no complete agreement can ever be made on the relative coordinates of two event can be made, not even on their relative times of occurrence). So, unlike a standard data base system, in which each fact is accepted universally or not, the situation here is of each fact being accepted universally, or pertinent only to a given user and to those users who accept the given user's viewpoint. Thus, trusted users may speak ex programico, dictating what is truth for all. Untrusted users can still add data to the system, but should only be held as holders of beliefs. This may be best shown by example.

Bob, a trusted user, speaking ex progmatico, says that his cat is large. In speaking ex progmatico, Bob supercedes the logic of belief structures and states absolute, inarguable fact. Bob also says, this time acting as a regular person, that his dog is small. Although Bob is given a great deal of trust, Bob's normal statement is accepted as Bob's belief. Bill, a regular, untrusted user, later says that Bob's cat is small, and that Bob's dog is big.

In the case of Bill's data entry, the statement about Bob's cat being small should be rejected, because the fact that Bob's cat is large is absolute. However, as a regular user, and from Bill's perspective, Bob's dog is indeed big. Thus, if Bill asks for information on Bob's animals, he should be told that Bob's cat is large (as Bob made known as absolute truth), and that Bob's dog is big (as is true from Bill's perspective).

If a third user, trusted or not, were to ask about Bob's animals, the result should be something on this order: "Bob's cat is large. Bob states that Bob's dog is small. Bill states that Bob's dog is big." Filtering is allowed, so that a statement under a given trust level can be ignored.

Figure 3:
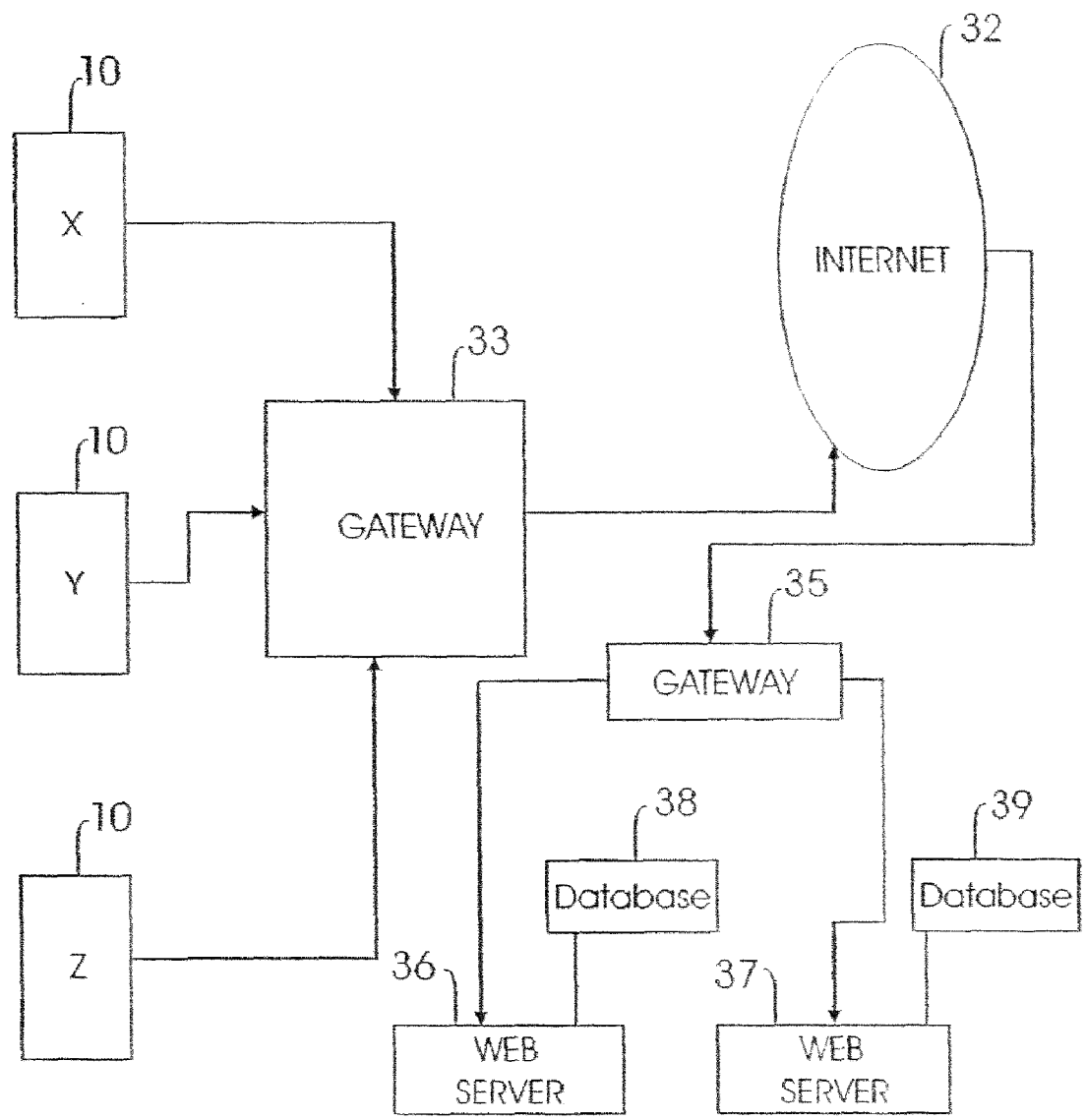
FIG. 3 is a block diagram of a typical topology of a computer network with computers, used according to one embodiment of the invention.

FIG. 3 shows a typical topology of a computer network with computers similar to computer 10, connected to the Internet. For illustration purposes, three computers X, Y, and Z are shown connected to the Internet 32 via the Web interface 26 (shown in FIG. 2) through a gateway 33, where the gateway 33 can interface N number of computers. The web interface 26 may be a modem, network interface card, or a unit for providing connectivity to other computer systems over a network using protocols such as X.25, Ethernet, or TCP/IP, or any device that allows, directly or indirectly, computer-to-computer communications.

It is noteworthy that the disclosure is not limited to a particular number of computers. Any number of computers that can be connected to the Internet 32 or any other computer network may be used.

FIG. 3 further shows a second gateway 35 that may connect a network of web servers 36 and 37 to the Internet 32. The web servers 36 and 37 may be connected with each other over a computer network. The web servers 36 and 37 can provide content, including consumer information from a database 38 and/or 39. The web servers 36 and 37 can also host the system for machine understanding of text, retention of knowledge and conversation, according to the disclosure.

The Internet 32 connects thousands of computers worldwide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language ("XML") as published by W3C Consortium, Version 1, Second Edition, October 2000 may also be used. The collection of all such publicly available computer files is known as the World Wide Web ("WWW").

The WWW is a multimedia-enabled hypertext system used for navigating the Internet 32 and is made up of hundreds of thousands of web pages with images and text and video files, which can be displayed on a computer monitor. Each web page can have connections to other pages, which may be located on any computer connected to the Internet 32.

According to the present invention, a method and system for machine understanding of text, retention of knowledge and conversation is provided. Although the system and method of the present invention are described with reference to the formal, speakable language Loglan, those skilled in the art will recognize that the principles and teachings described herein may be applied to a variety of formal, speakable languages.

In one embodiment, a method for formalizing the grammar of a natural language is provided. A grammar's form may be reduced to a set of utterances. Each utterance may include or more sentences. Each sentence may be a question, query, or statement. Sentences may be complex or atomic. Complex sentences are comprised of sub-sentences, joined by a logic word, such as a conjunction, disjunction or implication. Atomic sentences are comprised of a predication, which may have arguments, and may have adjectives or adjectival phrases. The way in which these components may be assembled, and which key-words may be used to do so depends on the factors involved in the original natural or artificial language.

Figure 4:
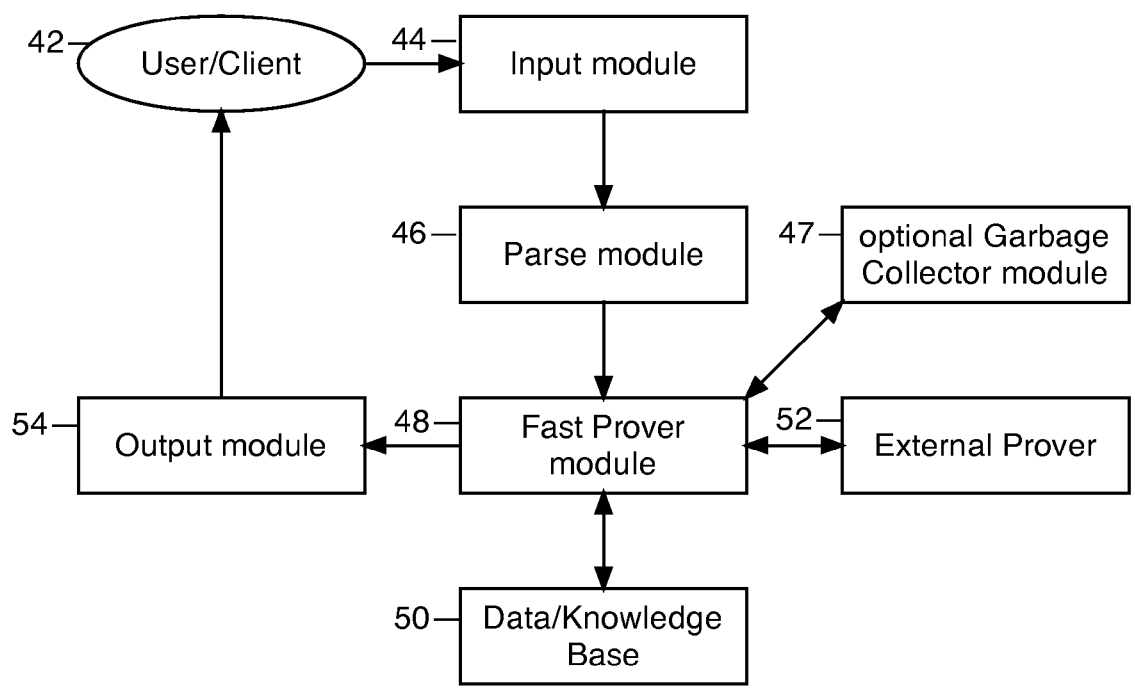
FIG. 4 is a block diagram of a system capable of understanding of text, retention of knowledge and conversation, according to one embodiment of the present invention.

FIG. 4 is a block diagram of a system 40 capable of understanding of text, retention of knowledge and conversation, according to one embodiment of the present invention. In the system 40, a user 42, client program, process or device, inputs data into an input module 44. (As described below with reference to FIGS. 5 and 8) The data is then transmitted to a parse module 46 which lexes and parses the data into an internal format or structure (in such a way that a memory of the original grammar structure present in the input data (in raw or optimized form) is retained) as known in computer programming. (As described below with reference to FIG. 8) "Parsing" is the process by which a known grammar definition (such as the BNF grammar shown herein) is translated to an internal representation or data structure by a means well known to practioners of computer programming. Parsing and retaining original (spoken or entered) structural data is described in AT&T's YACC manual, 1974 (see http://en.wikipedia.org/wiki/Yacc). Once parsed into an internal format, the internally formatted data is transmitted to a fast prover module 48, which interacts with a data/knowledge base 50. The "fast prover" is an enhanced form of a theorem prover program, which is sound but not complete. "Theorem prover" refers to a type of program well known in the field of artificial intelligence, "sound" refers to a category of such provers which do not make any incorrect assumptions, and "complete" refers to a category of such provers which can prove or disprove any theorem presented.

The retention of grammar structure is best shown by example. Consider the English utterance "Hi, Julio, how are you?". If a program were to store the text only, or a tokenized version of the text, or any of a number of representations of this sort, then the program would not be storing the original grammar. However, if the program were to store the same text as a series of grammar functions representing English grammar rules (such as they are known and apply) using the words (as follows), then it would be storing the originally-used grammer, as in this example: Utterance(SentenceWithInvocative(Invocative(InvocativeWord("Hi"), InvocativeTarget(Name("Julio"))), Sentence(Question(VerbWithModifier(QuestioningModifier("how"), Verb("are")), Object(Pronoun("you"))))))".

The interaction of data, words, and lexical structure between the stored input and the fast prover 48, as controlled by the coding of the fast prover program, may be used to prove statements, disprove statements, show that statements are plausible and thus save them in the knowledge base 50, or receive and format answers to questions and queries. Such proof or disproof uses the existing rules of predicate logic, first order logic, second order logic, and higher order logic, as well as a novel comparison scheme (described below with reference to FIG. 17). "Predicate logic", "first order logic", "second order logic", and "higher order logic" are well known terms in the fields of artificial intelligence and Boolean calculus. If a question is too complex for the fast-proving method (described below with reference to FIG. 16), because the question involves sub-proofs, the formatted statement or question, along with the formatted data/knowledge base 50, may be presented to an external or internal prover 52 in that prover's own language, with answers returned from the prover 52 to the fast prover 48, and there translated back into the internal format that has been selected. (As described below with reference to FIG. 17.) Results are then passed to an output module 54 for formatting into a language the user or other initiator, such as a device or program, 42 has selected.

The input data may be in the form of utterances spoken by a user, one at a time. Each utterance may be one or more statements, imperatives, questions, and/or queries and may be roughly equivalent to someone speaking and then stopping, or writing and then signaling the end of the note or transmission.

The utterance may be verbal, written, signed, referenced, imagined and picked up by an electronic sensing apparatus, such as a microphone, or through any other means known in the art. The utterance may be in the form of any type of sound, word, movement, symbol, and/or abstraction. In one example, a written utterance may be typed in to a command-line program or into a field of an interactive program, such as an Input field of a web-page or interactive program. Verbal input might be entered via one of several commercially available continuous speech recognition programs, such as Dragon Talker, or the Macintosh operating system. Signed input, such as American Standard Sign Language, may be ascertained using a camera or tactile input device, and delivered to the program as text.

When inputting the utterance into the system 40, the user may follow a known formal, speakable grammar, including situations where a grammar might allow a one-word utterance. In formal grammar, the rules of grammar, syntax, and meaning are pre-defined, such as in any computer language, mathematics, or some teaching versions of English or other languages, such as the Loglan grammars (available at http://loglan.org/Misc/grammar80.y).

Figure 5:
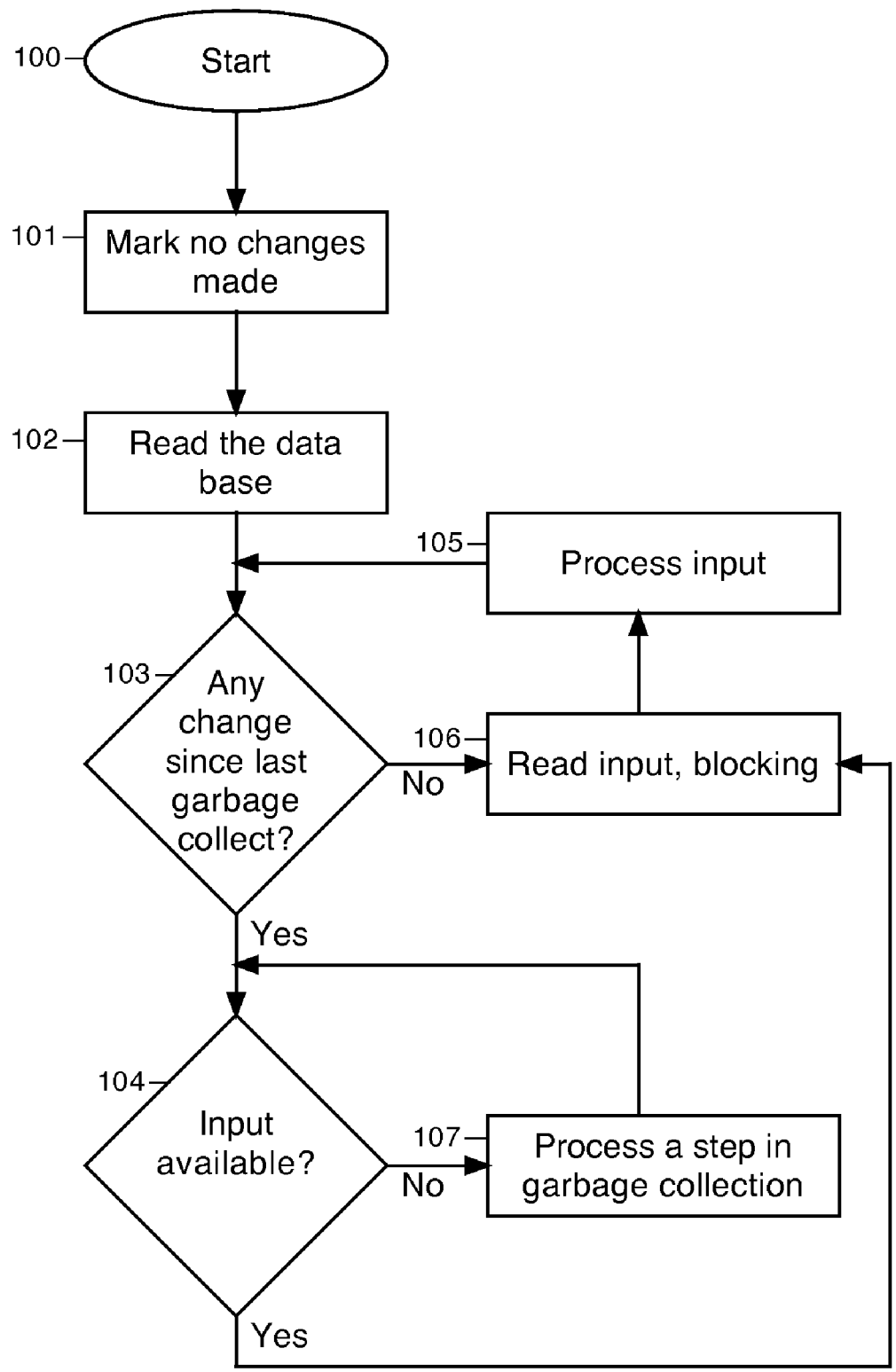
FIG. 5 is a flow chart illustrating a method operational on a system capable of understanding of text, retention of knowledge and conversation, according to one embodiment of the present invention.

FIG. 5 is a flow chart illustrating a method operational on a system capable of understanding of text, retention of knowledge and conversation, according to one embodiment of the present invention. Upon beginning 100 the process of the understanding of text, retention of knowledge and conversation, the system may establish a baseline of a database by noting that no changes to the database have been made 101. Next, the system reads the existing data/knowledge base in its entirety 102 and determines if there have been any data/knowledge base changes since the last "garbage collection" 103. Garbage collection may be processed during otherwise idle time, at predefined times, or upon user command.

"Garbage collection" is in general, removal of unneeded data. More specifically, garbage collection removes redundant facts, simplifying and speeding searches. In performing garbage collection during idle time, where "idle time" is defined as time where the system would otherwise stop, waiting for additional input not immediately available, the system performs an optimal amount of garbage collection, while remaining available for user requests, such as statements, questions, queries, or commands. It should be noted garbage collection may or may not be performed by the methods and systems of the present invention. Garbage collection will be described in detail below with reference to FIG. 6.

If there have been changes, the system may check for available input 104. If there is no available input, the system may perform a step (described below with reference to FIG. 6) in garbage collection 107 until input is available. If there is input available, or if there have been no data/knowledge base changes, the program or system reads the input 106 (described below with reference to FIG. 8). Once read, the input is processed 105 (described below with reference to FIG. 9). In one embodiment, the system may continue looking for more input indefinitely. In another embodiment, the system may continue looking for input until directed to terminate its processing, such as by a command input or specified time.

Computing System (Low-Level Description, Involving a Detailed Description of Some of the Items or Components Previously Called For)

Below, the terms "rule" and "fact" each refers to a datum or an item of stored knowledge.

Figure 6A:
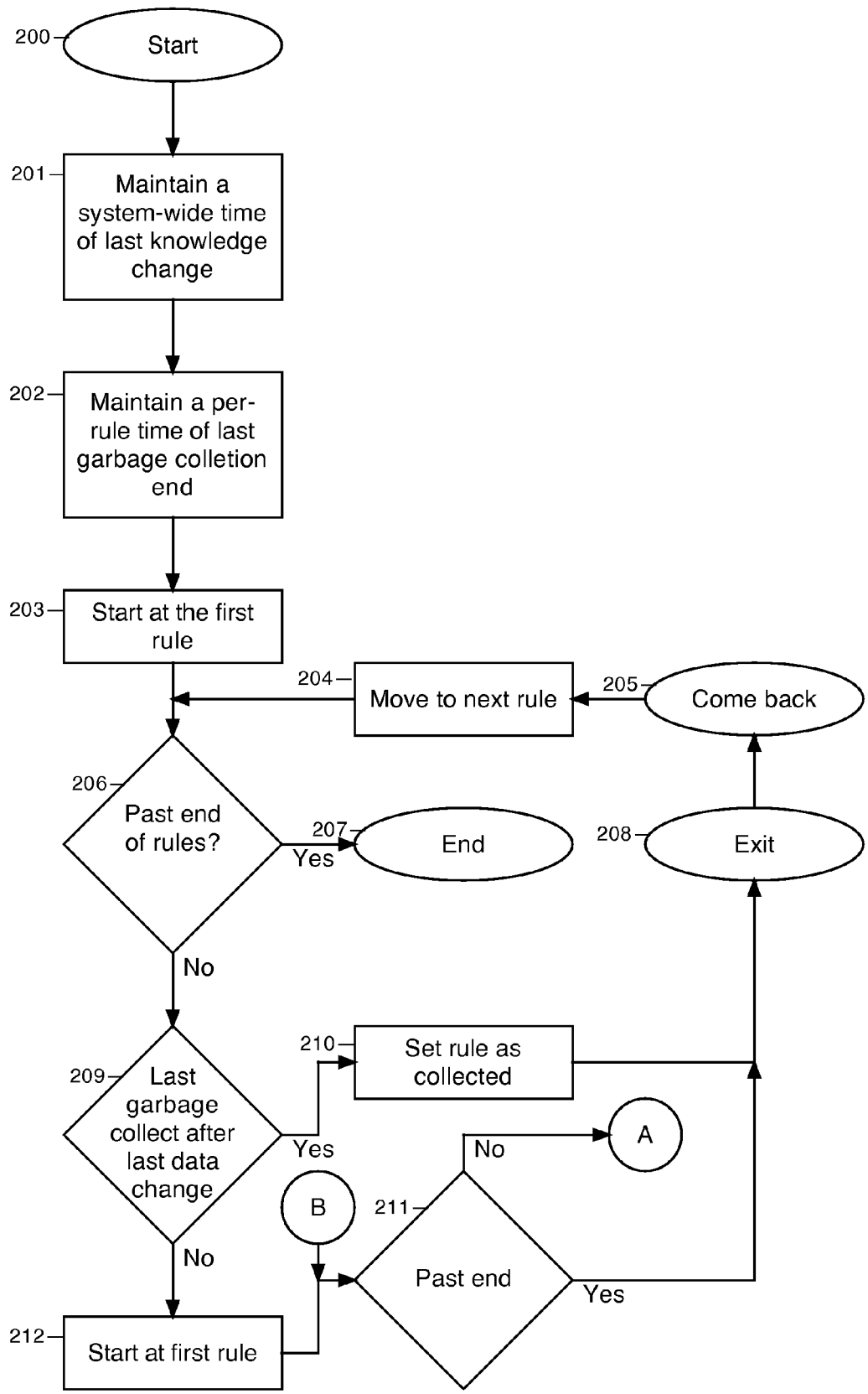
FIG. 6 (comprising FIGS. 6A and 6B) is a flow chart illustrating a method of garbage collection, according to one embodiment of the present invention.
Figure 6B:
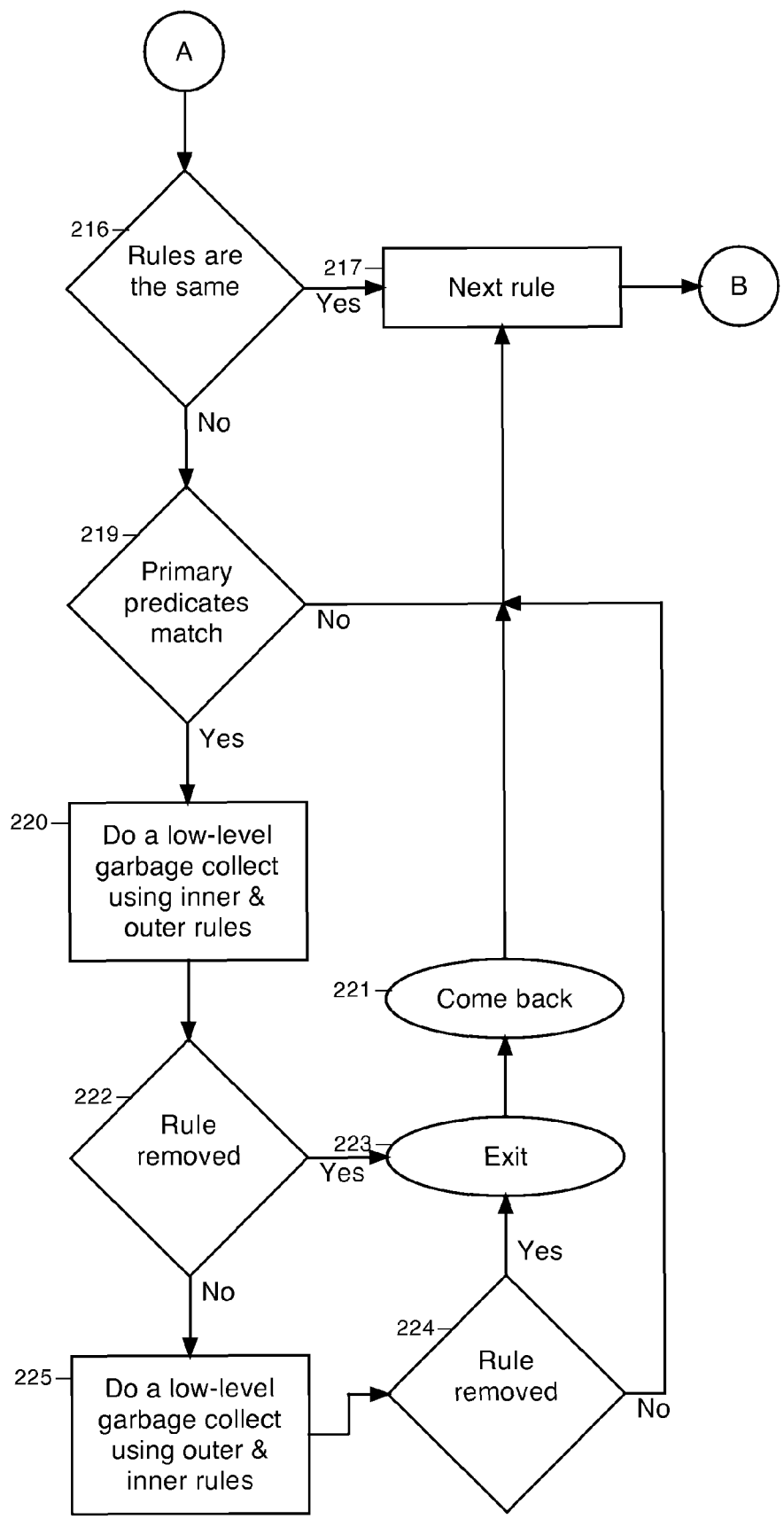

FIG. 6 (comprising FIGS. 6A and 6B) is a flow chart illustrating a method of high level garbage collection, according to one embodiment of the present invention. The garbage collection module removes unused facts from the data/knowledge base 50. Garbage collection begins 200 by creating a list of the status of garbage collection, if this is the first time into this area of processing. If there are multi-users or multi-processor configurations, only one shared list may be maintained 201. Additionally, a list of last run-times for each rule (fact) in the data/knowledge base may be maintained 202. The process begins at a fixed location in the data, typically the first fact or rule 203. Next, a search may be performed for any unneeded rules or facts 204-225, as described in detail below, where "unneeded" refers to a rule or fact which can be derived from one or more other rules or facts. For instance, if we know that Fido is a brown dog, then the fact "Fido is a dog" is unneeded, because it is implied by the previous fact. When all rules have been checked to see if they are unneeded (by virtue of implication, as described above) 206, then processing of the utterances is complete 207. If all the rules/facts have been checked, a determination is made as to which occurred last, a data change, or the completion of a garbage collection 209.

If a data change occurred last, then processing starts at the original start location, typically the start of the first rule 212. If the current position, for example the start of the first rule 212, then this method checks whether it is past the end of the list of rules or facts. If not, processing continues with specific rule checking (FIG. 6B). If processing is past the end, control returns to the caller 208, only to resume at the following instruction 205 when control returns. When control returns, the garbage collector must move on to the next rule or fact 204 and begin checking it 206. When the check above 209 determines that a rule or fact has been completely checked, then it marks that rule or fact as collected 210. Specific rule checking marked as "A" 215 begins with checking whether two rules are the same 216. Sameness is defined as identical structures with identical values. If the two rules are not the same, then this method must proceed to determine and act on similarity 219-225, as described in detail below. This method next determines whether the primary predicates match, by simple numeric or textual comparison 219. If there is not a match, processing continues with the next rule or fact 217.

A simple sentence has a main predicate, considered the primary predicate. If the sentence is compound, and both component sentences have the same primary predicate, then the compound sentence has the same primary predicate. If not, the compound sentence has no primary predicate. If a simple sentence has a question word in the place of its main predicate, then it has no primary predicate. If the predicates match, then a low-level garbage collection is done using the inner & outer rules (comparison in some order) 220 (described in more detail with reference to FIG. 7). If the low-level collection did not remove a rule or fact 222, then the low-level comparison is repeated 225 using the outer & inner rules (comparison in reversed order). If either low-level collection 220 or 225 resulted in a rule removal 222 and 224, then the collector has done enough work for now, returns control to the caller 223, returning to the following instruction 221. Then, this method loops back to reconsider the current rule or fact 219. Whether or not the two rules were the same 216, processing must advance to the next rule or fact 217, and then return to the garbage processing loop at marker "B" 218 (on FIG. 6B), and 213 (on FIG. 6A).

Once an utterance has been input into the system 40, the utterance is decomposed into sections by parsing, each of which may be evaluated separately. Although the system operates on formal languages, the invention is described in English. The English used in the examples shall be as formal as possible for English, in that only standard constructions are used. If the utterance "Streak is a cat and Fido is a dog." is entered, the utterance is decomposed into a first component "Streak is a cat", and a second component "Fido is a dog". The sentence would be known to be true if both components are known to be true, known to be false if either component is known to be false, and possible otherwise. In this utterance, the term "and" has two arguments, the statements "Streak is a cat" and "Fido is a dog". By the use of the "and" connective, the utterance may be decomposed and treated as two separate facts or statements. Each utterance stands on its own so statement order is immaterial. Statements such as: "Streak is a cat or Fido is a dog." cannot be decomposed logically as one statement depends on the other. However, the statements stand as separate syntactic items. In constructions other than "and", all of the rules of Boolean Calculus apply.

Each decomposed component may then be applied (compared) against the knowledge base. In general, a knowledge base may be a collection of facts and/or rules pertaining to facts. In the present invention, the knowledge base may be a list of learned facts, along with data as to the source of the facts. Data as to the source of the facts may be used in a determination of the believability of individual facts and of overall conclusions derived from one or more facts. This methods and systems of the present invention may be handled locally, remotely, embedded, via server, or distributed system, depending on the embodiment.

For statements, the statement must be tested against existing knowledge. Existing knowledge may be from current use of the system by a user, past use of the system by a user, from use of the system by other users, information built into the system by its implementers or administrators, or information swept from public or private sources by a variety of methods known in the art, such as described in U.S. Pat. No. 6,714,939. This may be done, as a full proof system, or as a simple comparison, or both. In the preferred embodiment, both a full proof system and a simple comparison are used. The simple comparison provides the quickest possible result, and the full proof is used to realize interactions between facts. Full proof spots implications, such as one or more statements leading to a new fact, or one or more statements precluding a fact. For example: If the knowledge base contained the rule "For all X, it is not the case that X is a cat and X is a dog", and the user supplied the fact "Streak is a cat", then there is an implication from the two given facts that Streak is not a dog.

If, for example, the user entered "Fido is a dog", a full proof may determine that Streak is not Fido, again by implication. Statements may be categorized as (a) known to be true, hereinafter referred to as "True"; (b) known to be false, hereinafter referred to as "False"; (c) neither known to be true nor to be false, and if true would be an independent fact hereinafter referred to as "Plausible"; and (d) Additionally, there is a special case of a fact being present, but obvious from other facts, hereinafter referred to as "Superfluous". For instance, given the facts, "Streak is a cat." and "Streak is a cat or Fido is a dog.", the latter is superfluous, since the first fact proves the second. Superfluous facts may be removed from the knowledge base as a foreground or background activity. Such removal of facts may be considered a form of "garbage collection" or lessening memory load. A superfluous fact is any information which may be proven or derived from one or more other, independent facts.

Figure 7:
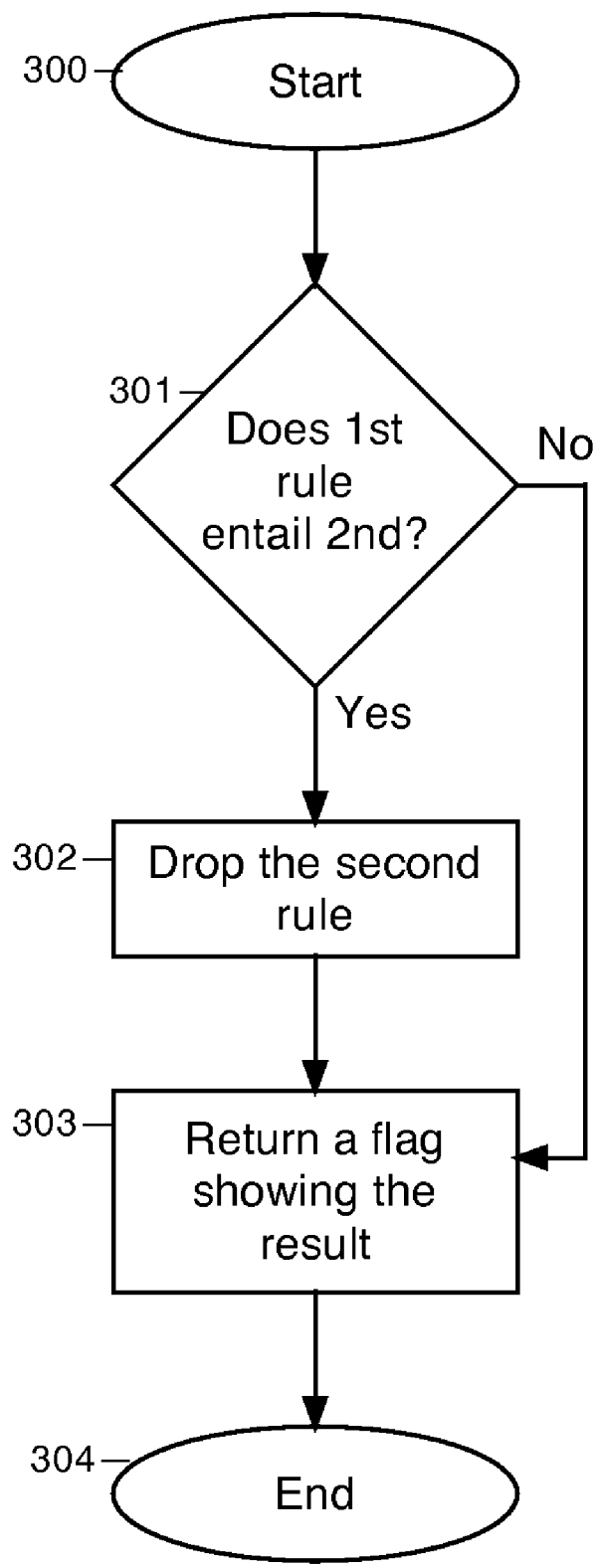
FIG. 7 is a flow-chart illustrating a method of low-level garbage collection, according to one embodiment of the present invention.

FIG. 7 is a flow-chart illustrating a method of low level garbage collection, according to one embodiment of the present invention. If low level garbage collection, which is a sub-process of Garbage Collection, is initiated 300, any two rules may be presented by the calling procedure, the high level Garbage Collection method as described above. If the first presented rule directly implies the second rule 301, using methods described herein, then the second entailed rule or fact is dropped as superfluous 302 and its caller (the high level garbage collector) is informed of the result by returning a flag showing the results 303 completing garbage collection 304.

Figure 8:
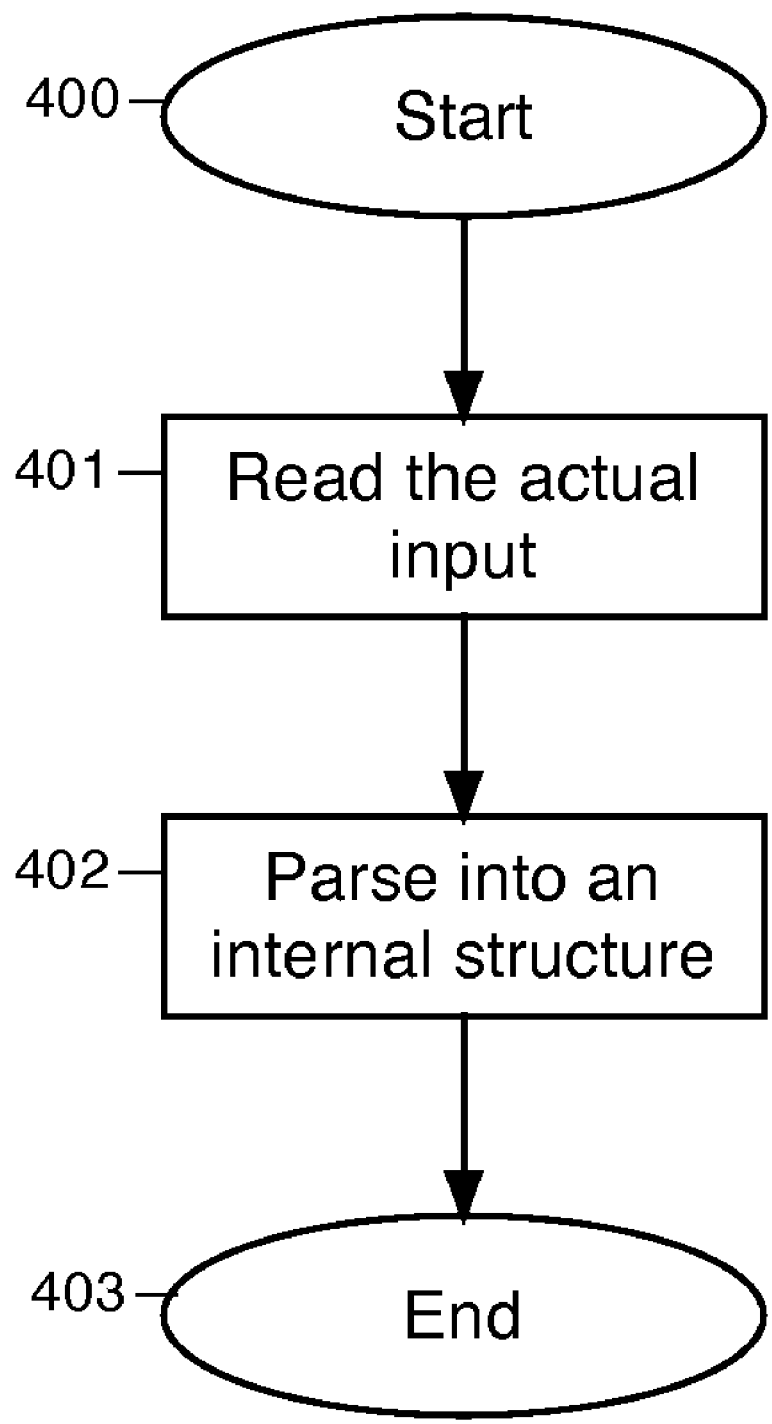
FIG. 8 is a flow-chart illustrating a method of reading input data, according to one embodiment of the present invention.

FIG. 8 is a flow-chart illustrating a method of reading input data, according to one embodiment of the present invention. The method begins 400 with the actual input of the data 401. Once input, the data is parsed into an internal structure in such a way that a memory of the original grammar structure present in the input data (in raw or optimized form) is retained 402, the method is complete 403. The parsing of lexical input is performed by any method known in the art. Data may be stored internally by any known method in the art.

Figure 9A:
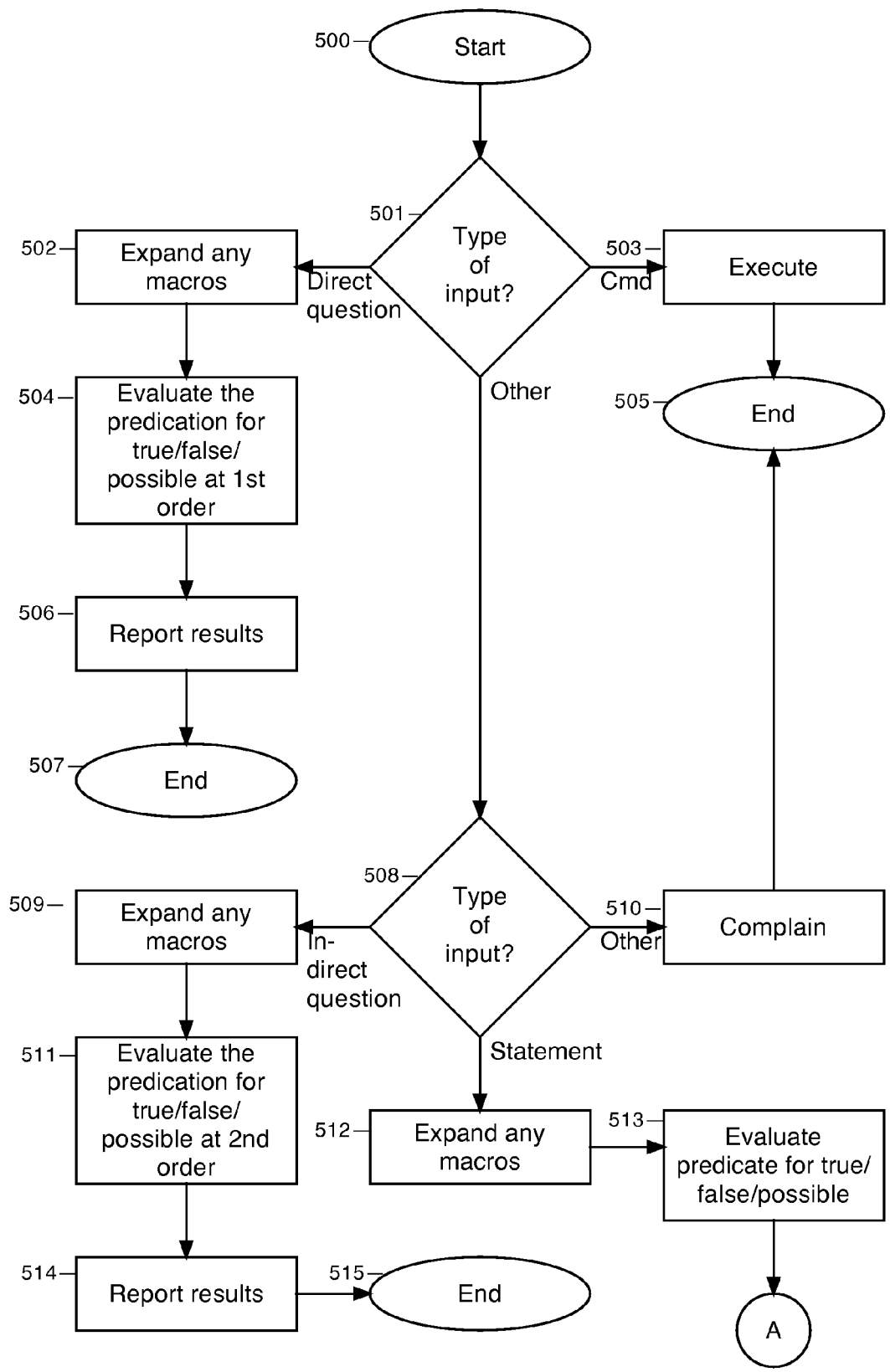
FIG. 9 (comprising FIGS. 9A and 9B) is a flow-chart illustrating a method of processing input data, according to one embodiment of the present invention.
Figure 9B:
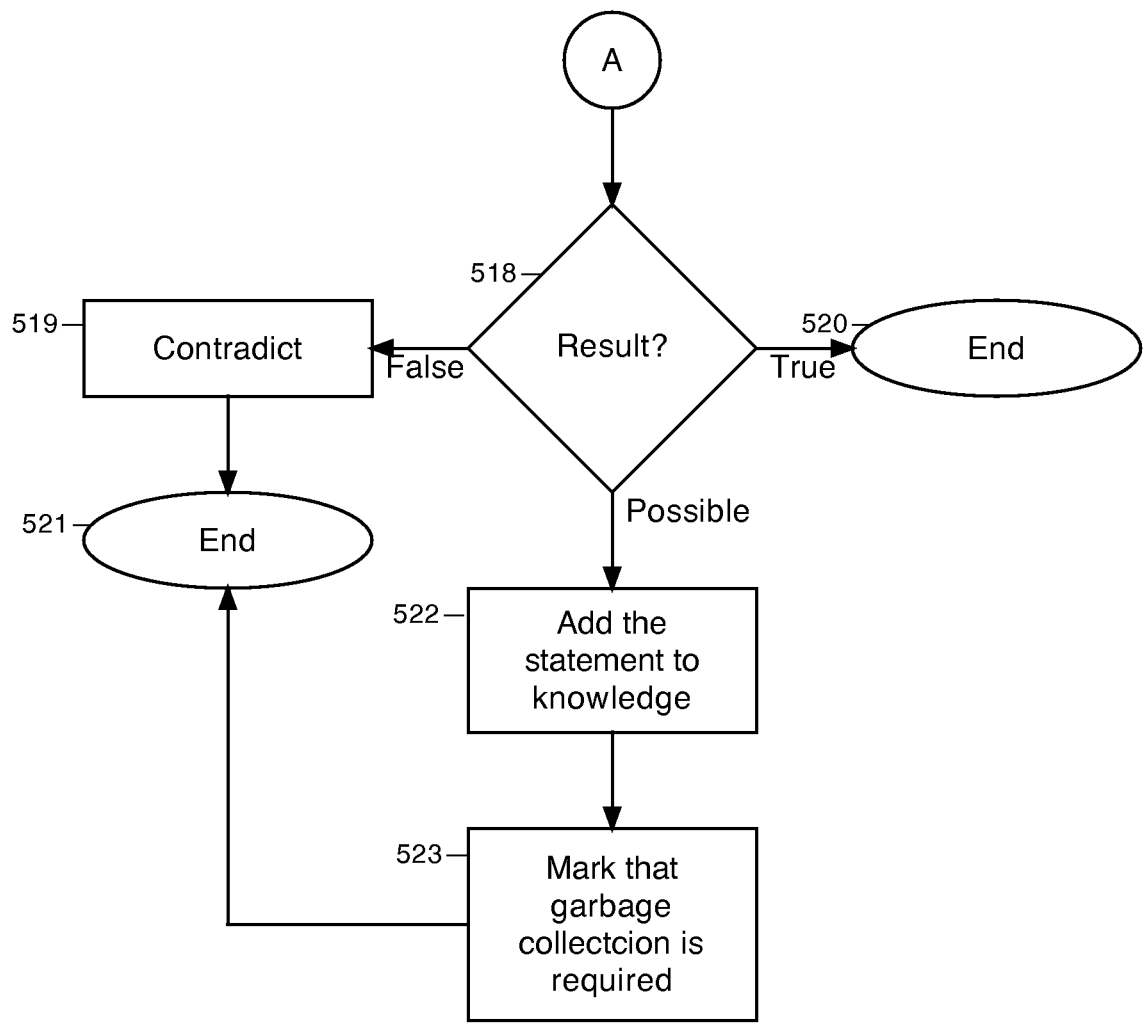

FIG. 9 (comprising FIGS. 9A and 9B) is a flow-chart illustrating a method of processing input data, according to one embodiment of the present invention. The method begins 500 by determining whether the input data is a direct question or a command 501. If the input data is a command (i.e. starting with a command key-word), the command is executed or performed 503 (described below with reference to FIG. 11) and the method is complete 505. It should be noted that the nature, syntax, meaning, and processing of commands are not detailed here, as these are well known in the art.

If the input is a direct question, then any macroinstructions (stored previously by use of the "let" keyword in the preferred English-like embodiment) 502 (described below with reference to FIG. 11). It should be noted that the existence and processing of macros are optional. Next, the question's predication may be evaluated for true/false/plausible at the first order 504 (described in detail with reference to FIG. 15). The results of the evaluation may then be reported to the user or client software 506 and the method is completed 507.

In the input is an indirect question (i.e. a question which contains question words), macros may be expanded 509 (described below with reference to FIG. 13), and the question is evaluated at the second order of logic 511 (described below with reference to FIG. 10). Orders of logic (first order, second order, and higher order—see http://en.wikipedia.org/wiki/First_order_logic, http://en.wikipedia.org/wiki/Second_order_logic and http://en.wikipedia.org/wiki/Higher_order_logic) are well known in the art. The results of the evaluation may then be reported to the user or client program 514 and method is completed 515.

If the input type is unknown, indicating an error, then a message is returned to the user or client program 510 (abbreviated in FIG. 9A as "Complain")

If the input type is a statement, macros may be expanded 512 (described below with reference to FIG. 13) and the statement may be evaluated as true, false, or possible 513. Based on the result type 518, true results may be accepted but not stored 520, although some implementations may alert the user to this occurrence, false statements may be rejected 519 ending the method 521, and possible statements may be accepted as fact and stored 522 (described below with reference to FIG. 14). When this occurs, the flag (as described above) indicates that data/knowledge has changed and is set, so that garbage collection may be restarted 523.

Figure 10:
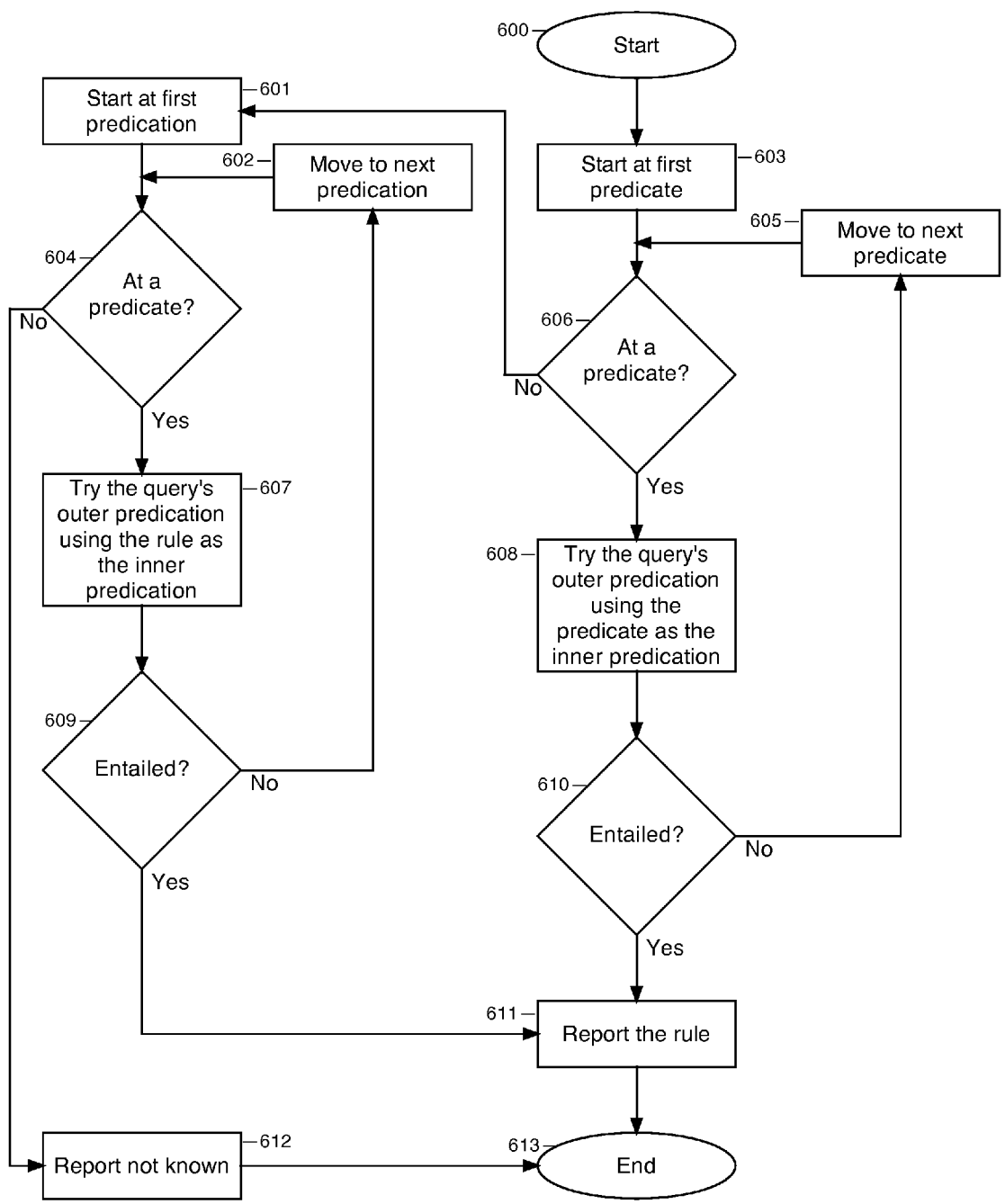
FIG. 10 is a flow-chart illustrating a method for processing the evaluation of a statement, question, or query, using second order and higher-order logic, according to one embodiment of the present invention.

FIG. 10 (which appears in abbreviated form as element 511 of FIG. 9) is a flow-chart illustrating a method of processing the evaluation of a statement, question, or query, using second order and higher-order logic, according to one embodiment of the present invention. To determine whether a statement may be accepted and whether a question may be answered, and if so, what the answer is, a calling or invoking process which presents a predication for evaluation and the existing data/knowledge base, may be used. This method begins 600 with the (logically) first predication in the data/knowledge base 603. It is anticipated that the implementer may store items in the data/knowledge base other than predications. Next, it is determined if the item under consideration is a predication 606. If not, it advances to the first predication to the end of the list of facts and rules 601. If at this point, there are no predications 604, no matches are reported 612 and returns to its caller 613.

If a predication is found, the presented predication (outer) is compared to the current (inner) predication 607. If the outer predication entails the inner 609, then the fact is reported to the caller 611. If not, this method advances to the next item 602 and the process is repeated 604. If the first test 606 found a predication, then the presented predication (outer) is compared to the current (inner) predication 608. If the outer predication entails the inner 610, then the fact is reported to the caller 611. If not, this method advances to the next item 605 and tries again (606).

Figure 11:
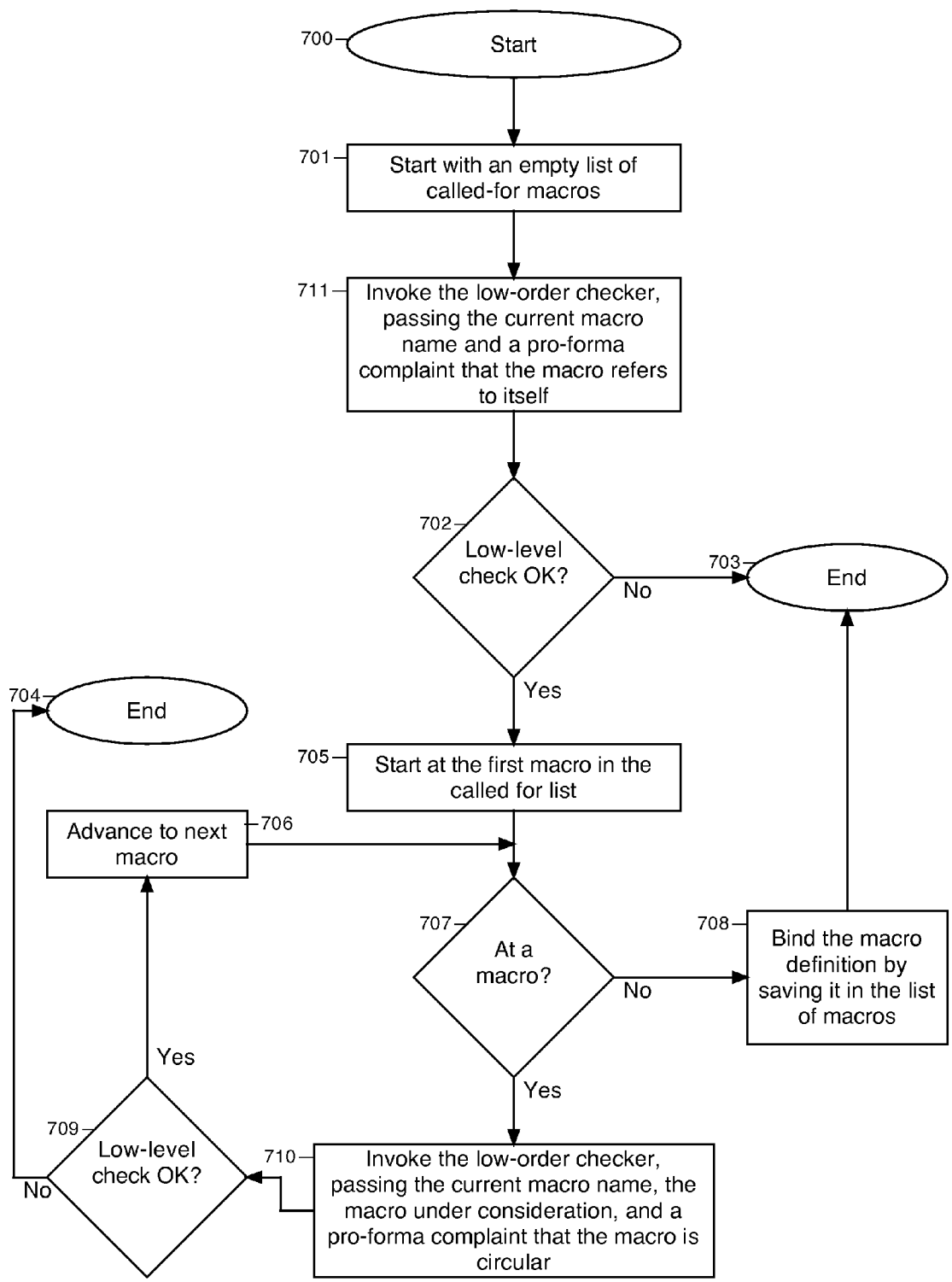
FIG. 11 is a flow-chart illustrating a method of building a macro, according to one embodiment of the present invention.

FIG. 11 is a flow-chart illustrating a method of building a macro, according to one embodiment of the present invention. It should be noted that using careful phrasing, such as an "is" predication can alleviate the need for macros. It should also be noted that macro binding can be considered a sentence or considered a command. The method begins 700 with an empty list of called-for macro instructions 701. The calling process passes, as an argument, the new macro. An error message is constructed indicating that the current macro refers to itself, a pro-form a complaint, and calls the low-level checker to check this circumstance, and possibly complain 711 (described in detail with reference to FIG. 12). If the low-level check failed 702, processing of this method stops 703.

Next, the rest of the existing macros are checked 704-710. This part of the processing starts with the first macro in the called-for list 705, and loops through the list 706-710, as described in detail below. When the list is exhausted 707, the macro under consideration is added to the called-for list 708, and is thus accepted, with processing complete 703. While there are still macros to check, a complaint is formatted that the current macro is self-referential, again as a pro-forma complaint. The low-level checker is called with the current macro and complaint 710 (described in detail with reference to FIG. 12). If the check failed 709, then the macro is rejected 704. If not, the method advances to the next stored macro 706 to resume its search for circular definitions 707. As such, problems are spotted when the macro is created, rather than when the macro is used.

Figure 12:
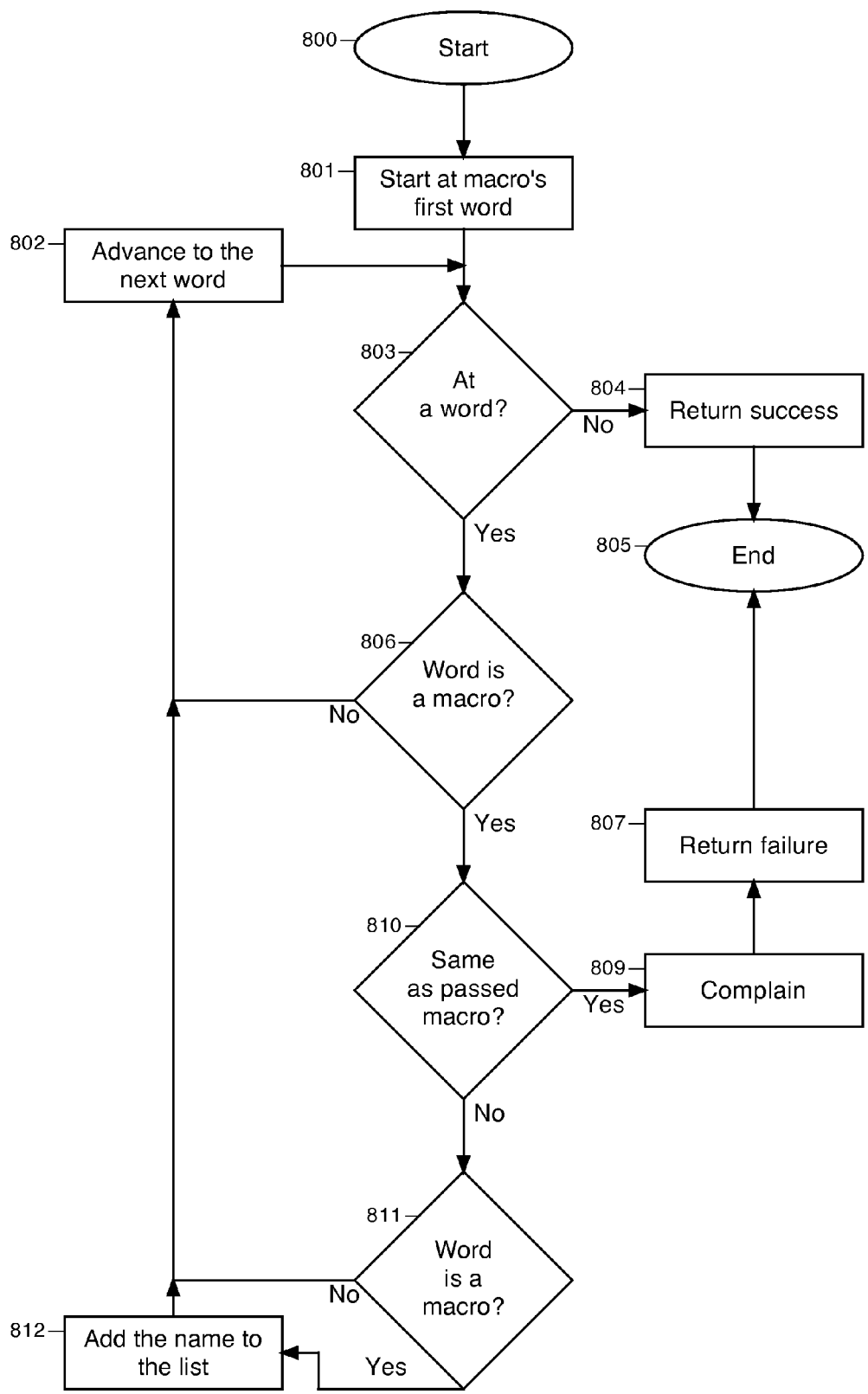
FIG. 12 is a flow-chart illustrating a method of a macro checking for recursion conflicts, according to one embodiment of the present invention.

FIG. 12 is a flow-chart illustrating a method of a macro checking for recursion conflicts, according to one embodiment of the present invention. The method begins 800 with the macro's first word 801. It is then checked in a loop (described as steps 802-812 below) word by word. At each stage, this method checks whether the macro's words have all been checked 803. If so, the caller is informed of the success 804 and returned to 805. While there are still words to check, a word-by-word check is done (described as steps 802 and 806-812 below). If the word under consideration is itself a macro 806, and is the same as the passed macro 810, then the passed complaint is issued 809, and a failure status is returned to the caller 807 and the method is completed. If the inner loop's word is a macro 811, then that word is added to the in-use list 812, and either way, processing continues with the next word 802. In this way, every word in a macro, and every word in any called macro at any depth are checked for circular references.

Figure 13A:
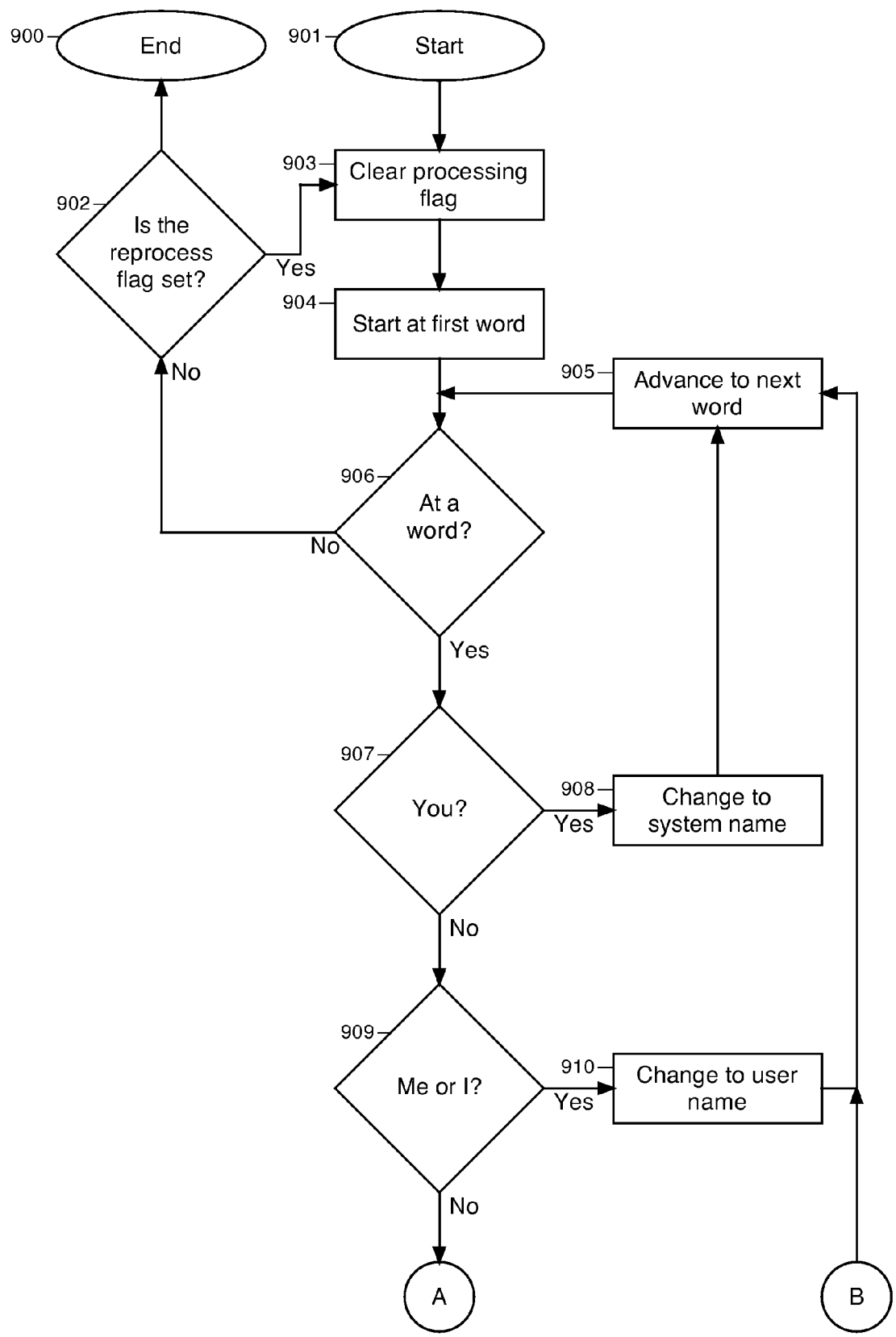
FIG. 13 (comprising FIGS. 13A and 13B) is a flow-chart illustrating a method of expanding a macro-instruction, according to one embodiment of the present invention.
Figure 13B:
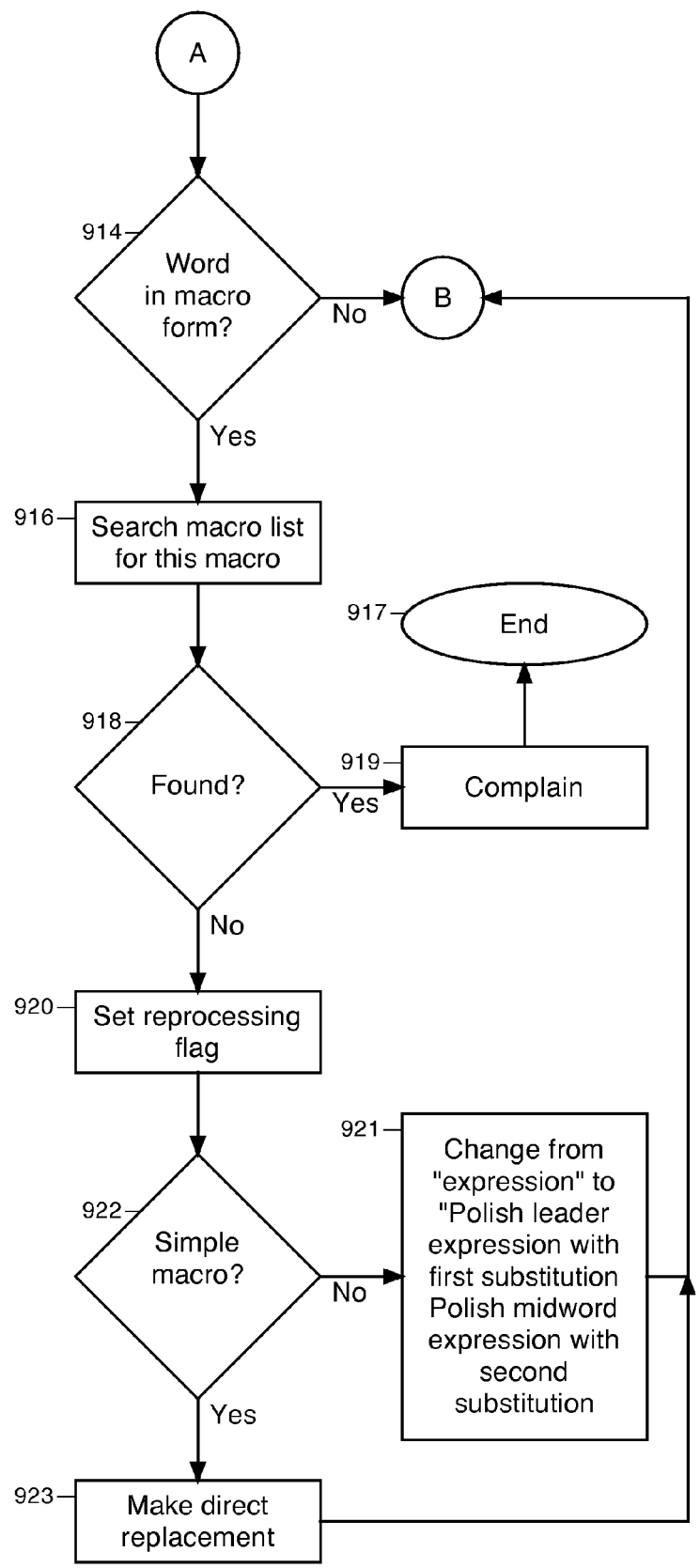

FIG. 13 (comprising FIGS. 13A and 13B) is a flow-chart illustrating a method of expanding a macro-instruction, according to one embodiment of the present invention. The method begins 901 with the clearing of a flag (a coded value) which controls reprocessing of macros within macros, setting the flag to indicate that no reprocessing is yet required 903 and at the first word 904. If the list of words is exhausted 906, then the flag determining reprocessing is checked 902. If set, processing begins again 903. If not, processing is complete 900.

If a word is available, and the word is "you" 907, then the word is replaced by the system's name 908. If the word is "me" or "i" 909, then the word is replaced by the user's name 910. If the word is a macro 914, then replacement processing occurs. The list is searched for the current macro 916. If found 918, a complaint (e.g., a warning, message, or indicator) is made that the macro was already present 919, and processing stops 917, as an optional consistency check. At this point, the reprocessing flag is set 920 to indicate that there is a macro in the macro expansion. If the macro is a simple one 922, then a direct replacement is made 923. If the macro is complex (containing a logical or arithmetic operator), then it is replaced by a compound statement in the selected style. In the example shown, the assumption is made that the language style is "Polish notation". Other styles, as detailed above, are also possible 921. In all cases, processing advances by advancing to the next word 905 and resuming the loop 906.

Figure 14:
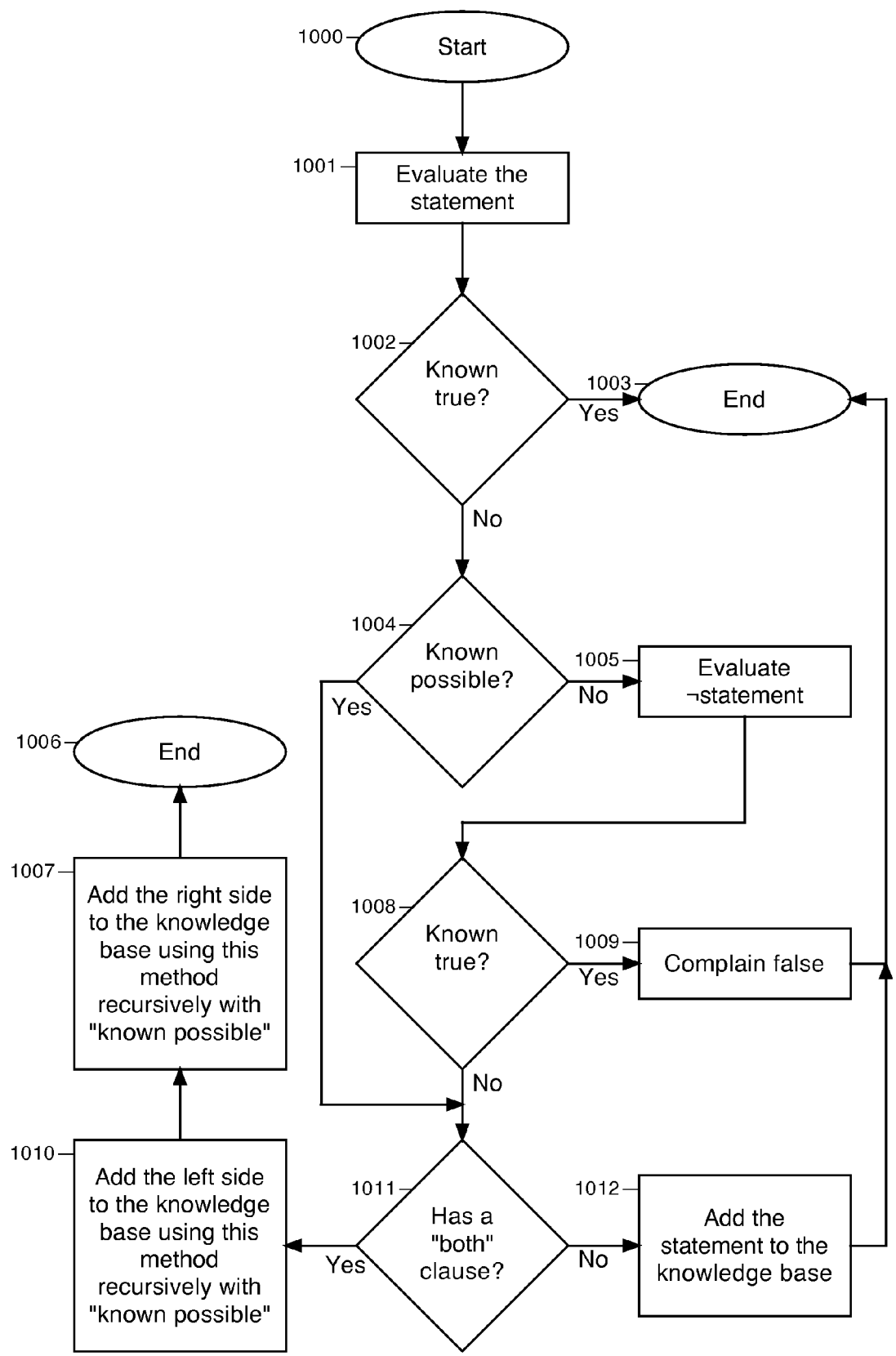
FIG. 14 is a flow-chart illustrating a method of adding a statement to a knowledge base, according to one embodiment of the present invention.

FIG. 14 is a flow-chart illustrating a method of adding a statement to a knowledge base, according to one embodiment of the present invention. The method begins 1000 with a simple evaluation of the statement 1001 (described below reference to FIG. 15). If the statement can be shown to be true 1002, then processing is complete 1003. If the statement is not known to be true 1004, then the negation of the statement is evaluated 1005. Note that a statement not being provably true does not imply that it is provably false. If the negation is known to be true 1008, then the statement can be shown to be false, and a complaint can be made 1009. If the statement is Possible, a check is made to determine if it contains a "both" clause 1011. If not, then the statement is added to the data/knowledge base directly 1012. If there is a "both" clause, then both components of the "both" clause are added, recursively using this method for each such clause, with the "Known Possible" flag set as an optimization 1010 and 1007. Once both sides have been added, this method is completed 1006.

Figure 15:
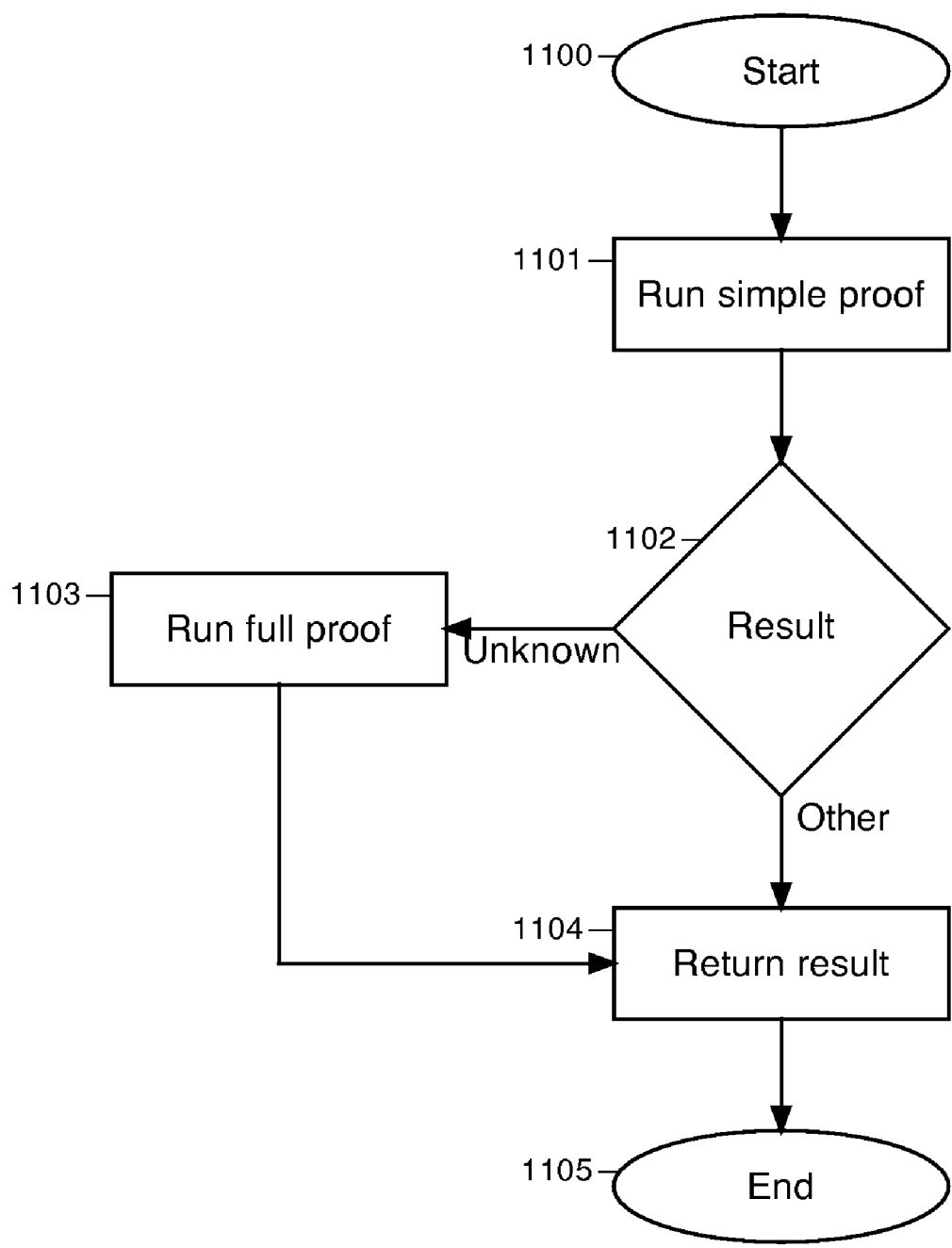
FIG. 15 is a flow-chart illustrating a method for evaluating a predication at first order, according to one embodiment of the present invention.

FIG. 15 is a flow-chart illustrating a method for evaluating a predication at first order, according to one embodiment of the present invention. The first order may be evaluated with the addition of modifiers present in this class of languages, but not in standard first-order logic. The method begins 1100 with an attempt at a simple proof of the statement 1101 (described below with reference to FIG. 16). If the results are "unknown", i.e. the results are Possible or containing a ques-tion too difficult to answer, then a complete proof would be run 1103 (described below with reference to FIG. 17). Otherwise (for True, False, and known answers) or after a proof, the result will be returned to the caller 1104 and the method is completed 1105.

Figure 16:
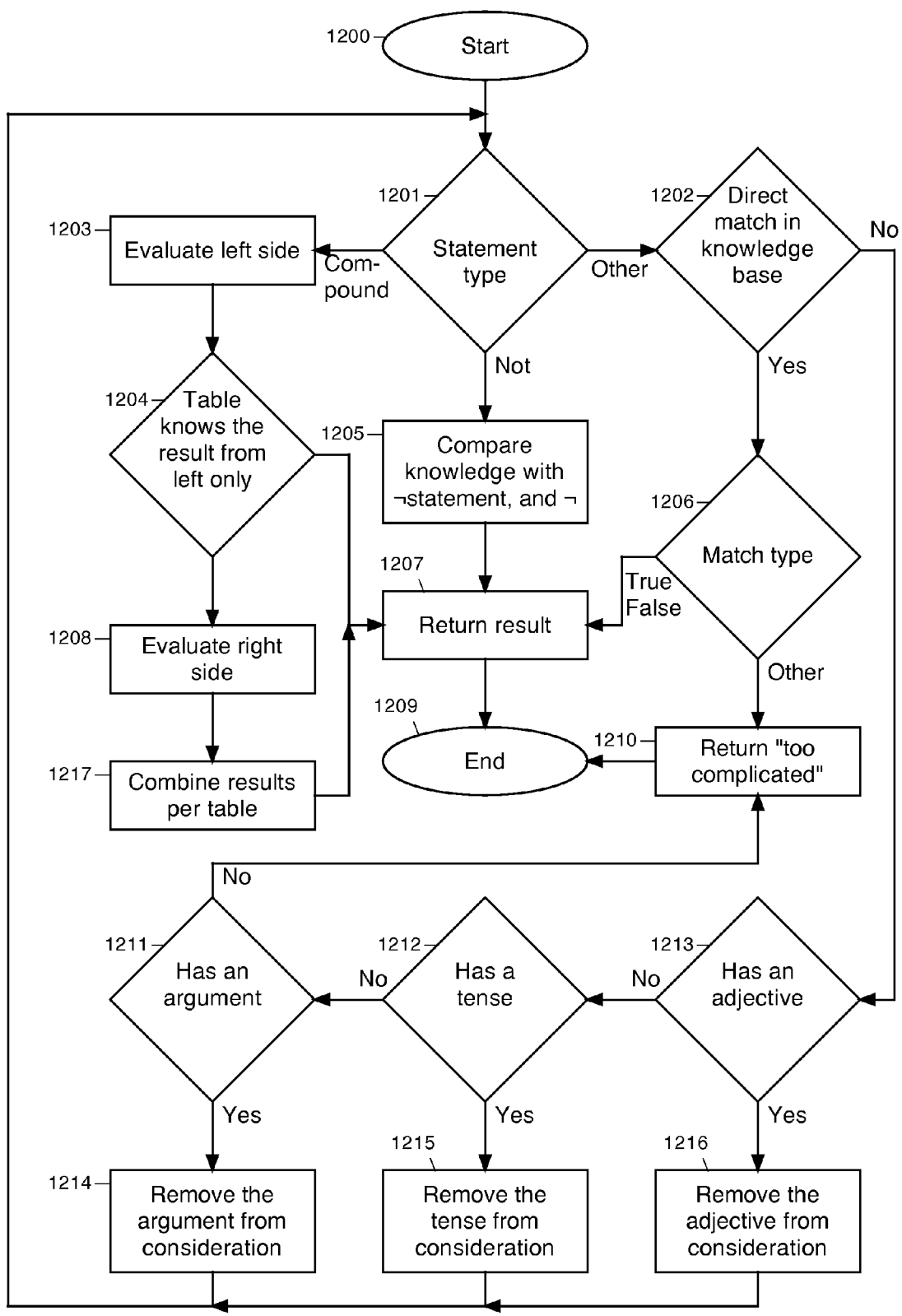
FIG. 16 is a flow-chart illustrating a method for comparing a single fact or rule with a single statement, query or question, according to one embodiment of the present invention.

FIG. 16 is a flow-chart illustrating a method for comparing a single fact or rule with a single statement, query or question, according to one embodiment of the present invention. The method begins 1200 with a check of the statement type 1201. If the statement is compound, then the left side or first component is evaluated 1203 (a recursive call). If a table (Table 1 detailed below) has a result based on the left component only 1204, then a result is returned 1207 and the method is completed 1209. Otherwise, the right side, or second component, is evaluated 1208, and the results are retrieved from the table 1217. If the statement is a "not" type, then the inverse of the statement is evaluated (recursively), and the inverse of the result is returned 1205. If the statement is neither a compound nor a "not", then a check is made as to whether a direct match is found in the data/knowledge base 1202. If so, the match type is evaluated 1206. If the match type is True or False, that is returned 1207. Other results are flagged as "too complicated" for higher-level evaluation 1210. If no direct match is made, a check is made as to whether an adjective or adjectival phrase is present 1213. If so, it is removed from consideration as an unneeded modifier 1216, and the match is tried again 1201. If no such match is made, a check is made as to whether a tense or tense phrase is present 1212. If so, it is removed from consideration as an unneeded modifier 1215, and the match is tried again 1201. If no such match is made, a check is made as to whether an argument is present 1211. If so, it is removed from consideration as an unneeded modifier 1214, and the match is tried again 1201. If no match is made at all, the "too complicated" result is returned 1210.

Table 3 below defines how logic results are combined in the procedures described with reference to FIG. 16.

TABLE 3

| Operation | Left argument is . . . | Action | Right argument is . . . | Result of operation |
|---|---|---|---|---|
| Both | True | Evaluate right argument | (unevaluated) | The result of the evaluation of the right argument |
| Both | Possible | Evaluate right argument | True | Possible |
| Both | Possible | Evaluate right argument | Possible | Possible |
| Both | Possible | Evaluate right argument | False | False |
| Both | False | Stop | (unevaluated) | False |
| Either | True | Stop | (unevaluated) | True |
| Either | Possible | Evaluate right argument | True | True |
| Either | Possible | Evaluate right argument | Possible | Possible |
| Either | Possible | Evaluate right argument | False | Possible |
| Either | False | Evaluate right argument | (unevaluated) | The result of the evaluation of the right argument |
| Implies | True | Evaluate right argument | (unevaluated) | The result of the evaluation of the right argument |
| Implies | Possible | Evaluate right argument | True | True |
| Implies | Possible | Evaluate right argument | Possible | Possible |

TABLE 3-continued

| Operation | Left argument is... | Action | Right argument is... | Result of operation |
|---|---|---|---|---|
| Implies | Possible | Evaluate right argument | False | Possible |
| Implies | False | Stop | (unevaluated) | True |
| Equivalent | True | Evaluate right argument | True | True |
| Equivalent | True | Evaluate right argument | Possible | Possible |
| Equivalent | True | Evaluate right argument | False | False |
| Equivalent | Possible | Stop | (unevaluated) | Possible |
| Equivalent | False | Evaluate right argument | True | False |
| Equivalent | False | Evaluate right argument | Possible | Possible |
| Equivalent | False | Evaluate right argument | False | True |
| Excludes | True | Evaluate right argument | True | False |
| Excludes | True | Evaluate right argument | Possible | Possible |
| Excludes | True | Evaluate right argument | False | True |
| Excludes | Possible | Stop | (unevaluated) | Possible |
| Excludes | False | Evaluate right argument | True | True |
| Excludes | False | Evaluate right argument | Possible | Possible |
| Excludes | False | Evaluate right argument | False | False |

Figure 17:
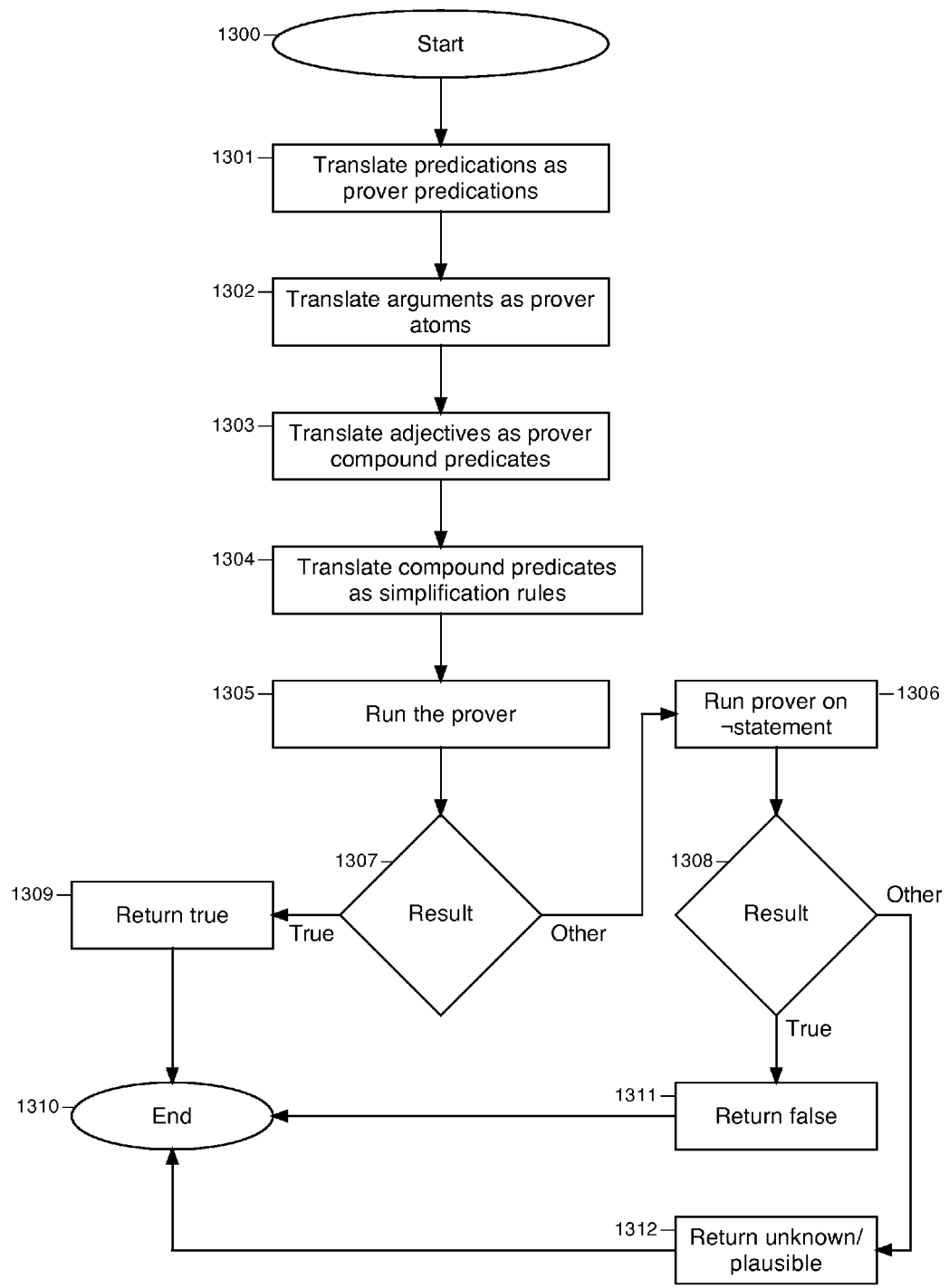
FIG. 17 is a flow-chart illustrating a method of a full proof, according to one embodiment of the present invention.

FIG. 17 is a flow-chart illustrating a method of a full proof, according to one embodiment of the present invention. The process starts 1300 by translating the stored predications into predications in the prover's language 1301. For example, the prover might use the Prolog language (see http://en.wikipedia.org/wiki/Prolog) as a prover interface, and would thus translate stored predications into Prolog. This in turn may first require translating predications into Horn clauses (see http://en.wikipedia.org/wiki/Horn_clause). Both Prolog and Horn clauses are well known in the art. Arguments stored in the data/knowledge base must be translated into "atoms" in the prover language 1303. Again, Prolog is a usable prover language. Next, translate adjectives as compound prover-language predications 1303. It should be noted that a predication with N adjectives or adjectival components may take $2^N$ prover-language predications. Next, the method may be repeated with compound predications 1304. Although shown as four separate steps here, it is also possible to perform these four translations as a single step. Next, the prover is run and the results are retrieved 1305. This may be an internal prover, or an external one.

In one embodiment, the RelFun prover (see http://www.dfki.uni-kl.de/vega/relfun+/extension/subsection3_3_1.html) may be used as it returns its status as Yes (true), No (false), and unknown, rather than Prolog's reportage of Yes (true) or No (unprovable). If Prolog or something similar is used, the results are evaluated 1307. If Yes (true), the method returns True 1309. Otherwise, the negation of the statement is sent for proof 1306 and the results are evaluated 1308. If the negation is proven, then False is returned 1311. If none of these conditions is met, then Possible is returned 1312. If, instead, RelFun or something similar is used, the method may proceed from the initial result check 1307 directly to final use of the results 1309, 1311 or 1312 without processing the negation 1306 and 1308.

Speed-enhancing algorithms known by those in the art may be utilized in the present invention. For example, multiple tasks or processors, or a network of computers, each to solve a piece of the proof or comparison may be used. In another embodiment, finding the root verb or predication (hereinafter, "Verb") of each statement, imperative, question, or query, and having a separate knowledge tree, list, or other storage mechanism for each possible Verb, or group of Verbs, or having an indexed list increases the speed. As a result, a much more limited set of statements would have to be searched.

In one embodiment, pronouns may be translated to nominative phrases on input, and back to pronouns on output. For example, the input "I live in The United States." may be stored as "Sheldon lives in The United States." and output as "Sheldon lives in The United States", or "You live in The United States." It should be noted that the verb tenses in English and most natural languages differ from the verb tenses in Loglan, Lojban and some other languages. In English, "I am small" means "I am small right now." However, in Loglan, "Mi Cmalo" means "I am at some time small." and "Mi Na Cmalo" means "I am currently small." In one embodiment, such tense markers (and markers for other types of inflections) may be tagged, so that "Mi Na Cmalo" may be stored with the effective meaning of "[According to such and such a user,] [Such and such a user] is [at such and such a time] small." Other inflections and tagging may be possible, for example, the Hopi language inflects "tense" for certainty.

Derivation of the Linguistic Components Used in the Described Class of Languages Although the example below will be illustrated using a means of collected items into a language similar to English, those skilled in the art will recognize that the principles and teachings described herein may be applied to embodiments tailored to look like other languages in a similar process, but with (for instance) adjectives following predicates for Spanish.

Although the example below will use characters in lowercase Roman letters, those skilled in the art will recognize that any code, including but not limited to, ASCII, EBCDIC and Unicode may be used, thus allowing any base natural language to be used.

Various commonly known mathematical operators, are taken from prepositional logic, in its base form, plus first and second order logic: ⌊Ⅎ , ∋,(, +, −, ·, ÷, ∠, ⇒,⇔,⊕, |, ¬, true and false. These logical operators, operations, and constants appear in the preferred English-like embodiment as: (a) for all variable . . . expression there exists variable . . . such that expression, (b) there exists quantifier numeric expression variable such that expression, (c) there does not exist variable such that expression, (d) both logic expression and logic expression, (e) either logic expression or logic expression, (f) neither logic expression nor logic expression, (g) the sum of numeric expression and numeric expression, (h) the difference between numeric expression and numeric expression, (i) the product of numeric expression and numeric expression, (j) the quotient of numeric expression and numeric expression, (k) the statement expression is implied by expression, (l) if expression then expression, (m) if and only if expression then expression, (n) exclusively logic expression or logic expression, (o) it is not the case that logic expression is true, (p) true, (q) false, and (r) the number such that predication.

It is possible to reformulate the grammar, presented herein as the preferred English-like embodiment, into other similar grammars, such as a Spanish-like grammar, however, care must be taken that the grammar remains unambiguous and parseable.

Example of Derivation from Loglan Language Structure

Predicates and adjectives are taken from the Loglan classes Preda, Dio, Ga, Ge, Geu, and Gu. Predications may be explicitly marked as "*lexeme/" or "*lexeme argument . . . /". It should be noted that "*" and "/" may be omitted if doing so would not contextually cause a problem. It should also be noted that the use of the asterisk and slash symbols are arbitrary and any word or symbol may be used. For speakability, these may be "predicate" and "end", respectively. One predicate may modify another predicate, for example, adjective predication affects predication. Thus, to say "pretty little girls' school", having a primary meaning of a school for girls who are little, and that such school is pretty may be said (or written) as "adjective pretty affects adjective adjective little affects girl affects school". The use of the keyword "adjective" is shown explicitly. Variations on the grammar may be constructed in which the absence of "adjective" and "affects" may bind left-to-right or right-to-left implicitly. It should be noted that some natural languages bind in one direction, and others bind in the other.

The concept of "and, jointly" is taken from the Loglan word Ze. For example, a user indicates he has a red-and-blue ball. It is not "a red ball and a blue ball", nor is it "a red ball in a blue way", nor "a blue ball in a red way". It is "a ball in a way that is jointly red and blue". It could also be described as "a ball and it is jointly red or blue. For this, "jointly" is introduced, which is tightly binding jointly predication and predication.

"Execute" is taken from the Loglan sentence-separating word I. A separation between two executables (utterances or queries), even though they are delivered together, as in: executable execute executable. Using Execute, or some other word in other embodiments, multiple utterances may be combined into a single entry or transmission. For instance, "Happy I Execute Sad You" submits "Happy I", then submits "Sad You", independently. However, "Both Happy I And Sad You" would be evaluated for thruthhood as a single statement.

Questions are taken from the Loglan class Ha. As a variable, the question word may be "what" or "which". As a predicate, "blank". Loglan has a class of rearranging words, Nu. In Loglan, the Nu-class words rearrange arguments. The system and method of the present invention do not need to rearrange arguments, as the present invention provides a simplified grammar in which there is nothing special about the first argument position.

First, any place an argument may appear, the word "anything" may appear in its stead, as an unconstrained value, meaning that the word "anything" may represent or hold the place of any argument, where "argument" holds the meaning assigned in formal logic, equivalent to "subject" or "object" in English. Second, when a predicate is used as an adjective or adjectival phrase, both machine and human listener or reader need to know in which way (pertaining to which argument position) the word is meant. For this, the word "emphasis" may be chosen. For instance, Go(x,y,z) means the going from x to y over path z. Thus, "adjective go affects *drive" would mean to drive in a going sort of way, as would "adjective go emphasis affects *drive". However, "adjective go anything emphasis affects drive" would mean to drive in a coming sort of way. However, to compensate for a fixed order, "anything" and "emphasis" is added here, with "anything" holding a place, and "emphasis" both holding a place, and indicating that the position is the key concept. This is used where Loglan would use a Nu-class word to rearrange the ordering of arguments, without explicitly using an argument. For the purposes of the current English-based example, the word "parent" might be used as a predication, where "parent X Y" means that X is a parent of Y. When used in a sentence, the concept "child" would not need a second word in the lexicon. To state that Y is a child, "parent anything Y" would do. To state that a cat is childlike, "adjective parent anything emphasis affects cat" would be used.

Loglan has a number of "it"-class words, Da: In English, "it", "he", "she", "him", "her", "they", and "them" all have meanings that are ambiguous. You have to guess the same meaning that the speaker is using. In Loglan, the meanings for "Da" through "Du", and their subscripted forms are unambiguous, but follow fairly complicated rules and are hard to follow in conversation. Here, for simplicity and formality, as well as ease of understanding, this form will be used: "let macro be argument". The variable name itself will be an upper-case letter other than "A" or "I". The binding to this variable should hold the length of the connection or until reset by a second use of "let" on the same variable name. When binding a name, a check must be made that the definition is not circular. When evaluating an utterance, these variables must be expanded. Some expansions will be direct, while others will require cloning the sentence. For instance, in "let X be both you and me execute go X home", the sentence must be expanded to "both go you home and go me home". Thus, extra forms are needed: (a) let macro be argument expression, (b) let macro be predicate expression and (c) let macro be numeric expression. Thus, these macros are of type simple argument, compound argument, simple predicate, compound predicate, simple numeric expression (such as "3" or "the sum of 3 and Z"), and compound numeric expression (such as "either 3 or 4").

Loglan has a word-class representing unknowns, Ba: This class of word, in Loglan, represents true variables, rather than macros. They appear in ⌐and ⌐situations. Thus, in this class of languages, the scope of each variable is only with its "for all" or "there exists" phrase. These variables will be represented by lower-case letters, other than "a" or "i". In implementation, there is a choice as to the life-span of an association with a variable, pronoun, or macro. At the choice of the implementer or user, variables (and other items) could retain their meaning for the length of a phrase (such as "For all x"), a predication, an utterance, a session (conversation), or permanently.

Loglan also has a built-in class of pronouns, Mi—Me, I, and you. Me and I, used interchangeably, represents the speaker. When used, these tokens will be replaced by the known name of the user. On output, the name of the particular knowledge-base computer system will be replaced by "me" or "I". For instance, "I like you", translated as "like I you" might be stored as "like 'Sheldon Linker' 'hal.linker.com'". If this text were read out of the system, it would be translated back as "like you me". If the data were read back to a different user, or on a different system, the "you" and "me" substitutions would not occur. "You" represents the knowledge-base system. Optionally, additional and/or other uses of pronouns may be used.

Loglan and mathematics both allow variables and lettered constants to have subscripts. In Math, we might use $X_2$. In Loglan, this would be Da Ci To or Dacito. In this example grammar definition, "sub" will be used. For example, "X sub 2" or "$X_2$". Subscripts are required because 24 variables won't always be enough.

In Loglan, there are a number of words for "we" and other compounds. In order to keep this class of languages more English-like (actually, more naturalistic, since English is only one basis language), and at the same time more like logic, and easier to follow, such compounds may be defined using "let" or some similar word. For instance, "let W be you and me", or "let U be 'ted' and i". Easier to follow, such compounds must be defined using "let". For instance, "let W be you and me", or "let U be 'ted' and i". Note that in other countries, other marks for names and quoted strings, such as ", <. or << might be preferred. To allow a quotation mark inside a string, a pair of quotes will do. Thus, the literal string "don't" would be represented as "'don"t'". That may be a bit hard to read, so here's an easier version: The string consisting of a single-quote character, the letter D, the letter O, the letter N, a single-quote character, another single quote character, the letter T, and a final single-quote character.

Loglan has a distinct class of names, easily recognized, and a class of name markers, the Djan and Lao word classes. The system and method of the present invention uses a quotation marker. In one embodiment, names use a double quote, and literal text uses single quotes. Names representing a person, place, thing, or named concept always act as arguments, and are represented as double-quoted strings. Because these name strings are marked names, and not literal strings, only letters and numbers should be considered, with internal white space being considered as a single space character. Thus, ""James Cooke Brown"" would have the same meaning (and storage) as ""james cooke brown"". Other examples of names might be ""Shangri-la"", ""Fido"", and perhaps even ""The theory of Relativity"".

Loglan has its Die and Ui classes of words to indicate attitudes. English has punctuation in the written form, and sound qualities in the spoken form. In the present invention, attitudinal indicators may be translated to distinct sentences, such as "I am surprised."

The Loglan vocative classes Hoi and Hue: Vocative markers, used in Loglan to gain or redirect attention, are not needed, as we're engaged in point-to-point communication.

The Loglan classes Jo, Kie, and Kiu, metaphor, are not used, such sentences being better stated as separate sentences, and so are not borrowed from English or Loglan.

Regarding the Loglan word classes Ie, Gue, Gui, Je, Ji, Jio, Jue, and Le: "The", connectives, descriptives: In English and Loglan, it is possible to say "the house". However, for the purposes here, "the house" is still too ambiguous, as it requires that the listener understand which house is meant by the speaker, using some form of plausibility context. Thus, a direct "the" is inappropriate. There are two ways around this. First, one could say that the Whitehouse is a white house with qualification: "adjective white affects house "Whitehouse"". Second, one could declare that the Whitehouse is white and a house in two separate clauses: "both white "Whitehouse" and house "Whitehouse"". Third, one could assign a variable: "let W be "Whitehouse" execute both white W and house W". A form had been considered which would be something on the order, "the house identified by . . . ", but that's (a) redundant with the above, and (b) a problem for execution order. Thus, "the" and the various "which is" and "known as" type words and clauses are rejected, and the slightly wordier forms just mentioned will suffice. However, a general form of "of" is provided: the item argument with property predication. (This is a form of "of" in that "with property" and "of" in English have similar meanings.) In this form, which is really a shorthand, a property can be linked to a thing. This is best shown by example: If we take a predicate "Own" to be Own (owner, owned), then "my house" could be "the item 1 house with property own me". "Emphasis" will be used to point out other meanings. For instance, Go is Go (with arguments traveler, whence, wither, path). Thus, "the restaurant I'm going to" is "the item 1 restaurant with property go i anything emphasis" (showing in which way something is "of" something else, or in which way one thing is a property of another). Internally, anything of this form will split the predication into two components, and introduce an unnamed variable. as shown above. Yet a further short-hand is provided: my argument. This is equivalent to the statement "the item argument with property own me" in the current hybrid-language example, where "hybrid" means a combination or merging of a speakable, formal language (such as Loglan), and of a natural language, where "speakable" means a language that can be spoken in normal human discourse (such as English or Loglan), where "formal" means a language with a completely defined non-ambiguous grammar (typically defined in BNF notation, such as Loglan or Fortran), and where "natural" means a naturally acurring language (such as English). Note that Fortran is formal but not speakable, since you can't ask for a cookie in Fortran, and that English is speakable but not formal, because "pretty little girls school" is ambiguous, because there are at least 26 meanings of the phrase. Of course, we also need the grammatical form: your argument.

One way to turn a predication into an argument is to put number in front of it. A literal number or numeric expression will quantify the item. For instance, "1 apple" would be an apple. "2 apple" would be two apples. "0.5 apple" would be half an apple. To get to "the apple", One would need to first identify a particular item, using means described above. When tempted to use "the", note that the item must have already been fully qualified, and thus "1" will do.

Loglan's Ni class of words also has other numeric forms. Special words mean "all", "most", and "some". Thus, these words can be used to quantify a predication into an argument. This can take the following forms: (a) all of predicate expression, (b) most of predicate expression, (c) some of predicate expression, and (d) little of predicate expression. This form can also be used in questioning: (e) how many predicate expression. Note that "most of apple" means "most of an apple", and not "most apples".

The Loglan word-class Lo, which introduces a class: Items can be taken as a class. For instance, "the class apple" means "the class consisting of all apples", or just "apples" in some uses. This appears as the class predicate. Quantifiers can be applied with classes. So, "half of all apples" would be "0.5 of class apple". "some apples" (meaning "a certain percentage of all apples", rather than "a certain number of apples") would be "some of the class apple". This can appear in the following forms: (a) numeric expression the class predicate expression, (b) most of the class predicate expression, (c) some of the class predicate expression, (d) little of the class predicate expression, and (e) how much of the class predicate expression.

The Loglan classes Guo and Po allow the distinct description of events. One may speak of an event. The loss of attitudinal indicators requires it. For instance, rather than saying "May The Force be with you", without the indicators, this would be "I desire the event: The Force is with you", or "desire i the event *with "The Force" you". Note that an asterisk is used before "with", because "with" would otherwise be a key-word. Likewise, properties can be described, such as happiness. This may appear as (a) the event predication, or (b) the property predicate expression.

The Loglan word Lio: number: Using this phrasing, a number can be turned into an argument: the number numeric expression. For instance, "the number 7"

The Loglan class Pa, covering tenses, allows us a time basis, which is not normally a part of any form of mathematical or Boolean logic, and which is especially hard to narrow down in any natural language. Tenses in Loglan, and in this class of languages, inherit from every language in the world, including the Hopi languages. Thus, tenses include time, certainty, and a number of other factors. Each tense modifies everything to its right, and tenses can be stacked. Unprivileged users get a default tense which tags an event as their opinion. Time tenses are listed following, to be followed by other tenses: (a) at time reference predication, (b) on time reference predication, (c) after time predication, (d) on or after time predication, (e) beginning time predication, (f) beginning after time predication, (g) before time predication, (h) on or before time predication, (i) ending time predication, (j) ending before time predication, (k) potentially predication, (l) during time predication (This last tense is the "-ing" tense. Time references can be a single time, or a period, using [i] time, [ii] time through time, [iii] date, [iv] date time, [v] now, [vi] today, [vii] this period, [viii] last period, [ix] next period, [x] offset . . . from time, [xi] offset . . . before time, [xii] tomorrow, [xiii] yesterday, or [xiv] a named date. Dates can be in the form yyyy, yyyy-mm, or yyyy-mm-dd. They can be followed be ad, ce, bc, or bce. (Although all words have been shown in lower case, case is irrelevant.) Times can be in the form hh, hh:mm, or hh:mm:ss. In the preferred implementation, all times are assumed to be GMT. Period names can be second, minute, hours, day, week, month, and year. Offsets can be numeric expression period or a period. Periods may be in the plural. Named dates may include Sunday through Saturday and January through December.), (m) certainly predication, (n) on good authority predication, (o) likely predication, (p) as a belief predication, (q) as a guess predication, (r) according to argument predication, (s) located at argument predication, (t) located at a distance of distance from argument predication, (u) located at a distance of up to distance from argument predication, (v) located at a distance of at least distance from argument predication, (w) located at a range of distance to distance from argument predication, (x) near argument predication, (y) far from argument predication, (z) a meter, (aa) numeric expression meters, (bb) when, (cc) where, and (dd) tense, which asks which tense is appropriate.

Each predicate is transparent. It doesn't matter to the system or language what the predicate means to you. However, we need to understand what it means. An example would be Go. The following is expressed in functional form: Go(a,b,c, d) we will take to mean "A goes from B to C over path D". If we take Come(a,b,c,d) to mean "A comes to B from C over path D", then we can define "⌐a,b,c,d, Go(a,b,c,d)™ Come (a,c,b,d)". Missing arguments are assumed unspecified, so that "⌐x,P(x), P(x)® ⌐y, P(x,y)".

Figure 18:
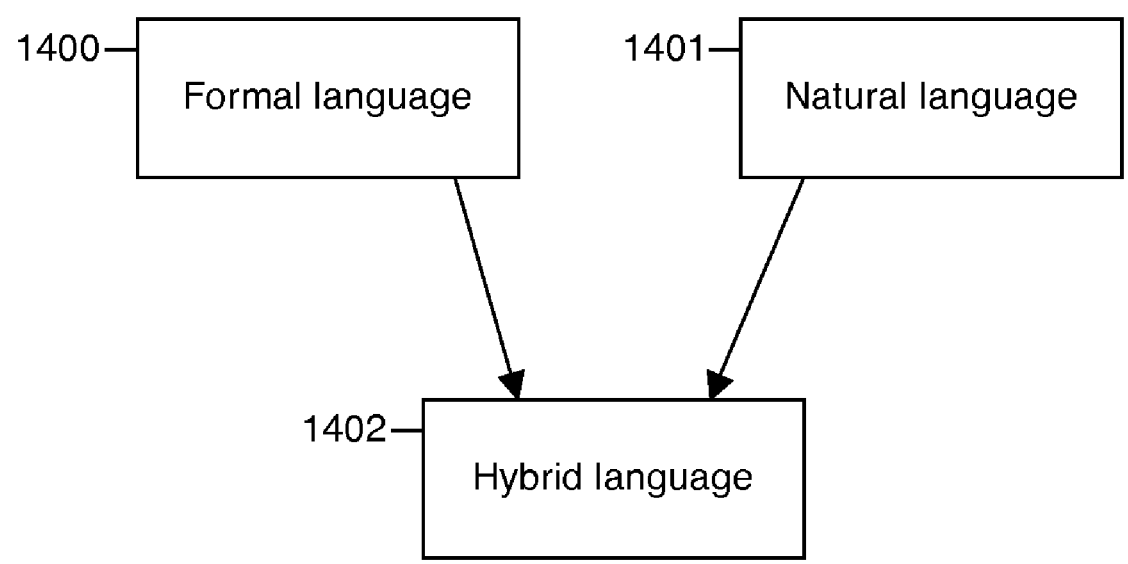
FIG. 18 is a block diagram illustrating how natural, formal, and/or hybrid languages may be combined.

Rules of Syntax in the Preferred English-Like Embodiment, and Formulation of the Language in the Present Invention FIG. 18 is a block diagram of how languages are combined. The rules of grammar used in a hybrid language 1402, such as English-like and Loglan-like languages, were derived by taking a fully descriptive formal, speakable language 1400, Loglan in this example, and a natural language 1401, English in this example, and combining them. The languages were combined by (a) Removing all components of the formal language that where redundant. This includes, but is not limited to, removal of infix (afterthought) operators as they are redundant with, but not as powerful as, prefix (forethought) operators, removal of attitudinal indicators (words which convey emotion or attitude) as such conveyances may be made through the use of direct statements, removal of parenthetical remarks as they can appear as sentences, removal of invocatives, since there is exactly one listener (the computer or the user), and removal of linked connectives (similar to "which is" or "having" in English) and replacing them with "with property"; (b) adjusting the formal language's rules of syntax to meet (a) above; and (c) replacing the vocabulary of the formal language with the vocabulary of the natural language. Each of these steps must avoid the addition of "shift-reduce conflicts", or "reduce-reduce conflicts" (well known terms in the art) in the grammar, although there are circumstances under which grammerians and/or programmers will be willing to accept shift-reduce conflicts.

This set of syntax rules follows the descriptive rules above, but is only a sample embodiment of syntax rules. Any set of rules encompassing all of the above, and remaining unambiguous will do. Typically, the rules of syntax will exist as a part of the program, or as tables of built-in data. The basic unit of work is the transmission. The following symbology, in extended BNF, concisely describes a grammar that meets the requirements above, and can be used by practitioners of the art to generate a parser in such a way that a memory of the original grammar structure present in the input data (in raw or optimized form) is retained, which is a critical component of a language compiler. "→" means "can be expanded to". "|" means "or". ";" denotes the end of a possible expansion. Items in boldface are to be recognized as keywords, subject to the proviso that anything following the escape character ("*" or "predicate" in the preferred implementation) is not considered a keyword. Items in italics are the names of rules. Items in upper case are items to be recognized by a lexical analyser (lexer). Items between "[" and "]" are optional productions, a term well known in the art:

```
transmission → [ transmission execute ] utterance ;
utterance → predication | question | assignment ;
assignment → let macro be argument
    | let macro be predication
    | let macro be number ;
macro → UPPERCASELETTER [ subscript ] ;
subscript → sub NUMBER ;
question → is predication value
    | for which variableList is predication value ;
value → true
    | false ;
variableList → [ variableList ] variable ;
variable → LOWERCASELETTER [ subscript ] ;
predication → for all variableList predication
    | there exists variableList such that predication
    | there exists at least number variable such that predication
    | there exists at most number variable such that predication
    | there exists number variable such that predication
    | there does not exist variable such that predication
    | both predication and predication
    | either predication or predication
    | neither predication nor predication
    | the statement predication is implied by predication
    | if [ and only if ] predication then predication
    | exclusively predication or predication
    | it is not the case that predication is true
    | adjective predication affects predication
    | asterisk WORD argumentList slash
    | blank argumentList slash
    | jointly predication and predication
    | tenseList predication
    | value ;
asterisk → *
    | predicate
    | ERROR ;
slash → /
    | end
    | ERROR ;
argumentList → [ argumentList ] argument ;
argument → what
```

```
      | which
      | anything
      | emphasis
      | variable
      | macro representing an argument
      | both argument and argument
      | either argument or argument
      | neither predication nor predication
      | the item argument is implied by argument
      | if [ and only if ] argument then argument
      | exclusively argument or argument
      | me
      | i
      | you
      | SINGLEQUOTEDSTRING
      | DOUBLEQUOTEDSTRING
      | number predication
      | some predication
      | [ number ] the class predication
      | some the class predication
      | the event predication
      | the property predication
      | the number number
      | the item argument with property predication
      | my argument
      | your argument ;
some → all of
      | most of
      | some of
      | little of ;
number → NUMBER
      | the sum of number and number
      | the difference between number and number
      | the product of number and number
      | the quotient of number and number
      | how many
      | both number and number
      | either number or number
      | neither number nor number | exclusively number or number ;
tenseList → [ tenseList ] tense ;
tense → at timeReference
      | on [ or after ] timeReference
      | [ beginning ] after time
      | beginning time
      | [ on or ] before time
      | ending [ before ] time
      | potentially
      | during time
      | when
      | where
      | tense
      | certainly
      | on good authority
      | likely
      | as a belief
      | as a guess
      | according to argument
      | located at [ a distance of [ up to ] distance from ] argument
      | located at a distance of at least distance from argument
      | located at a range of distance to distance from argument
      | near argument
      | far from argument ;
timeReference → timeSpec
      | time through time ;
timeSpec → [ offset offsets from ] simpleTime
      | offset offsets before simpleTime ;
offsets → [ offsets ] offset ;
offset → an timeTime
      | number timeType ;
an → an
      | a ;
timeType → wmy
      | years
      | months
      | weeks
      | days
      | hour[s]
      | minute[s]
      | second[s] ;
      simpleTime → date
          | [ date ] time
          | now
          | today
          | tomorrow
          | yesterday
          | this wmy
          | last wmy
          | next wmy ;
      date → DATE [ bc[e] ]
          | DATE ad
          | DATE ce
          | january
          | february
          ...
          | december
          | sunday
          | monday
          ...
          | saturday ;
      time → TIME [ am ]
          | TIME pm
          | noon
          | midnight ;
      wmy → week
          | month
          | year ;
      distance → an meter
          | number meter ;
      meter → meter[s] ;
```

The rules involving ERROR are context-sensitive rules that are well-known in the art. These rules allow certain elements to be removed from usage in the language, and assumed later. Such context rules may also be referred to as "shift-reduce conflicts", and allow parsing to continue at the deepest level, i.e. stay with the longest form of the current grammar rule under consideration, rather than considering the rule of grammar complete, until such time as the "ERROR" lexeme forces a return to a higher level, i.e. the grammar rule is complete, and processing continues with the grammar rule that included the just-completed grammar rule).

Imparting knowledge of the meaning of vocabulary: To establish the working rules of thought, it need only be explained in this system or class of languages. In one embodiment, there may be a base dictionary and understanding, an encyclopedic set of knowledge, and knowledge gained in conversation with users.

The basic understanding knowledge base can follow this example, defining big, large, and small: "for all x for all y if both large x y and large y z then large x z execute for all x for all y if and only if large x y then small y x execute for all x for all y if and only if large x y then big x y".

In a real-world knowledge system, most of what the system will be doing will be looking up facts, and not trying to prove something. For example, a user of the present invention may ask what the temperature is in New York. That won't require much in the way of proofs. It will simply require finding the data. So, any algorithm should assume, for the sake of speed, that the data will look something like "A(a) ˆB(b) ˆC(C) . . . " internally or a series of stated facts externally, and that the query will look something like "?B(b)", or like "B(_)", or like "_(b)" internally, or a question (typically involving "is it the case that") or query (typically involving a question word, such as "who", "what", "which", "how many", "when", or other similar words) externally.

In comparisons, "refinement" is important. If one sentence is a refinement of another, it states the same fact(s), but in a narrower manner. An example is "X is a ball". If a second statement, "X is a blue ball", then the latter is a refinement of the former, since X being a blue ball entails X being a ball. Notice that this is not a two-way entailment. Some sentence A may thus be a refinement of B. A refinement may replace its generalization, as it can be used to prove its generalization. Thus, a refinement and a generalization match if a refinement is being used to prove a generalization. A Refinement may also be considered a state of logic, as a special case of "True".

Rather than maintaining these four states of logic (True, False, Possible, and Refinement) as such, internally, only the standard True and False states actually need be maintained. If a new statement X is made, and X can be shown to be true, then X is true (and can be discarded). If a new statement X is made, and ¬,X can be shown to be true, then X is false (and can be rebutted and discarded). If a new statement X is made, and neither X nor ¬,X can be shown to be true, then X is possible, and can be taken as a statement of fact on the part of the user. The previously described logic held that if a refinement was held as fact, then the basis it replaces should be immediately dropped from the data base. For example "Bob is a short man" is a refinement of "Bob is a man", and thus "Bob is a short man" must be maintained, but "Bob is a man" becomes redundant and may be discarded.

Immediate dropping of now-redundant data upon receipt of a refinement is not actually necessary. Indeed, the system may run faster in the short term without it such dropping. Responding to the user is a real-time activity, but removal of redundant data need not be. Rather, a form of garbage collection can be used. In the simplest form, $\Box Fact_x$, $\Box Fact_y$, $((Fact_x \circledR Fact_y) \ni, (x \ne y)) \circledR$ Redundant $(Fact_y)$.

Although the grammar shown herein for the preferred embodiment is in a very English-like form, known to programmers as Polish form (see http://en.wikipedia.org/wiki/Polish_notation), in other embodiments, other forms can be used. A partial list follows:

TABLE 4

| Form name | Example |
| --- | --- |
| Full Polish | either both A and B or both C and D |
| Polish | either both A B both C D |
| Polish symbol | | &A B & C D |
| Full reverse Polish | A and B both or C and D both, either |
| Reverse Polish | A B both C D both either |
| Reverse Polish symbol | A B & C D & | |
| English infix with priority: | Precedence: and over or: A and B or C and D |
| Infix with priority | Precedence: & over |: A & B | C & D |
| English infix with parentheses | (A and B) or (C and D) |
| Infix with parentheses | (A & B) | (C & D) |
| Functional | Or(And(A, B), And(C, D)) |
| Symbol functional | |(&(A, B), &(C, D)) |
| Reverse functional | ((A, B)And, (C, D)And)Or |
| XML functional | <function operation="or"> <function operation="and"> A B </function> <function operation="and"> C D </function> </function> |
| XML specific | <or> <and> A B </and> <and> C D </and> </or> |

Figure 19:
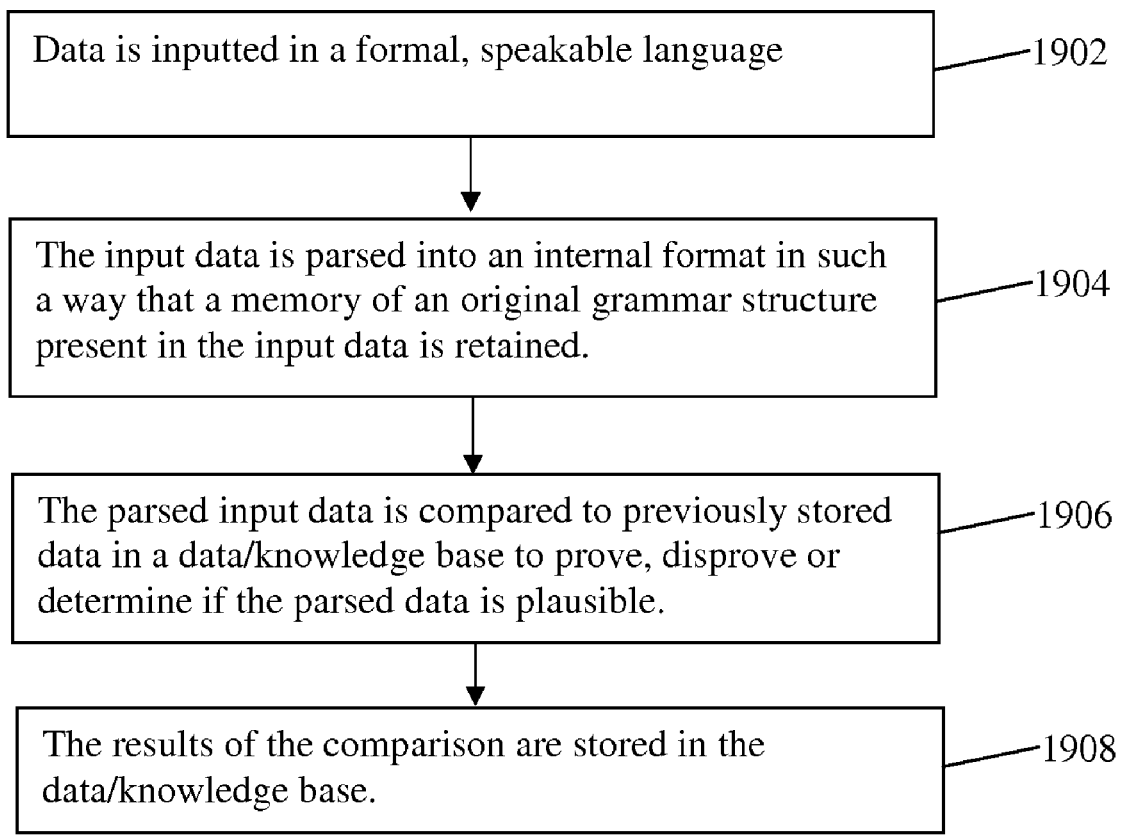
FIG. 19 is a flow diagram illustrating a method for storing and retrieving data in a formal, speakable language.

FIG. 19 is a flow diagram illustrating a method for storing and retrieving data in a formal, speakable language. Data is inputted in a formal, speakable language 1902. Such formal speakable language may have a more defined grammar and/or syntax than natural languages (e.g., English, Spanish, Japanese, etc.) but are more flexible and speakable in comparison to machine languages (e.g., Fortran, Basic, Java, etc.). The input data is parsed into an internal format in such a way that a memory of an original grammar structure present in the input data is retained 1904. The parsed input data is compared to previously stored data in a data/knowledge base to prove, disprove or determine if the parsed data is plausible 1906. The results of the comparison are stored in the data/knowledge base 1908.

The formal, speakable language may be understandable by speakers of a corresponding natural language. The input data may be at least one word of text or speech. Inputting the data may be performed in a formal, speakable language and parsing the input data into an internal format include, (a) receiving the input data in a formal, spoken or written language and/or (b) translating the data into an internal data structure. The formal, speakable language may be at least one of a Loglan-compatible, Lojban-compatible language structure, or any other speakable formal language structure. The input data may be one or more utterances including at least one or sounds, words, movement, symbols, or abstraction. The one or more utterances may be verbal, written, signed, referenced, imagined or picked up by an electronic sensing apparatus. The method may further comprise (a) comparing a first utterance to a second utterance, where the first utterance has a higher level of specificity than the second utterance, to determine if the second utterance is superfluous, (b) determining whether the input data is a command, a statement of fact, or a question, and/or (c) discarding the input data if the input data is a statement known to be true or false, wherein the statement is added based upon rules of possibility, conjunctions, implications, and disjunctions. The formal language includes a grammar structure defined by: (a) a first characteristic to form predications and statements; (b) a second characteristic to form questions and queries; (c) a third characteristic to apply modifiers to portions of the text; and/or (d) a fourth characteristic ability to apply a broad category of tenses to portions of the text. The method may further comprise: (a) retaining the input data if the input data is a statement which provides new information to the data/knowledge base and adding the statement to the data/knowledge base, (b) formulating an answer if the input data is a question or query. Additionally, the method may also comprise (a) retrieving selected data stored in the data/knowledge base in response to a question; (b) formatting the selected data into an original natural language for output, wherein the selected data is formatted into a natural or artificial language for output in response to the question based on stored data in the data/knowledge base.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

One or more of the components, steps, and/or functions illustrated in FIGS. 1, 2, 3, 4, 5, 6, 7, 8, 9, 10, 11, 12, 13, 14, 15, 16, 18 and/or 19 may be rearranged and/or combined into a single component, step, or function or embodied in several components, steps, or functions. Additional elements, components, steps, and/or functions may also be added without departing from the invention. The apparatus, devices, and/or components illustrated in FIGS. 1, 2, 3, 4 and/or 18 may be configured to perform one or more of the methods, features, or steps described in FIGS. 5, 6, 7, 8, 9, 10, 11, 12, 13, 14, 15, 16, 17 and/or 19. The novel algorithms described herein may be efficiently implemented in software and/or embedded hardware.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. A method operational in a processing device, comprising:
   inputting data into the processing device in a formal, naturalistic, speakable, hybrid language, wherein the formal, naturalistic, speakable, hybrid language is characterized by having a completely defined set of non-ambiguous grammar rules and excludes natural languages;
   parsing the input data at the processing device into an internal format in such a way that a memory of an original grammar structure present in the input data is retained;
   comparing the parsed input data with previously stored data in a data/knowledge base according to non-statistical, logic operations to prove, disprove or determine if the meaning of the parsed input data is plausible;
   storing results of the evaluation in the data/knowledge base, wherein the input data is obtained from a plurality of different users and the data/knowledge base stores knowledge while recognizing, maintaining, and storing distinct realities for different users; and
   in reply to a question, generating one of an auditory or visual response at the processing device in the formal, naturalistic, speakable, hybrid language based on accumulated knowledge of the data/knowledge base,
   wherein for the same question, a first auditory or visual response for a first user is contradictory to a second auditory or visual response for a second user if the first and second users have different realities.

2. The method of claim 1, wherein the formal, naturalistic, speakable, hybrid language is understood by speakers of a corresponding natural language having ambiguous grammar rules.

3. The method of claim 1, wherein the formal, naturalistic, speakable, hybrid language is based on a grammar structure for a formal language and vocabulary of a natural language.

4. The method of claim 1, wherein the formal, naturalistic, speakable, hybrid language is characterized by at least one of a Loglan-compatible or Lojban-compatible language structure.

5. The method of claim 1, further comprising
   comparing a first utterance to a second utterance in an open-loop, where the first utterance has a higher level of specificity than the second utterance, to determine if the second utterance is superfluous.

6. The method of claim 1, wherein the formal, naturalistic, speakable, hybrid language includes a grammar structure defined by:
   a first characteristic to form predications and statements;
   a second characteristic to form questions and queries;
   a third characteristic to apply modifiers to portions of knowledge in the data/knowledge base to formulate the response; and
   a fourth characteristic ability to apply a broad category of tenses to portions of the text.

7. The method of claim 1, further comprising retaining the input data if the input data is a statement which provides new information to the data/knowledge base and adding the statement to the data/knowledge base.

8. The method of claim 7, wherein the statement is added to the data/knowledge base based upon rules of veracity, conjunctions, implications, and disjunctions, where veracity is achieved based on a veracity level associated with a user providing the statement.

9. The method of claim 1, wherein all forms of knowledge are stored together in the data/knowledge base as predications.

10. The method of claim 1, wherein generating the response in the formal, naturalistic, speakable, hybrid language includes utilizing adjectival phrases to qualify the knowledge.

11. The method of claim 1, wherein generating the response in the formal, naturalistic, speakable, hybrid language, time-sensitive context of knowledge in the data/knowledge base is considered in formulating the response.

12. The method of claim 1, wherein such distinct realities for different users includes contradictory conclusions for different users.

13. The method of claim 1, wherein different veracity levels are associated with the different users, such veracity levels are utilized in generating the response from inconsistent knowledge stored in the data/knowledge base.

14. The method of claim 1, wherein the response is in full sentence format.

15. The method of claim 1, wherein the data/knowledge base concurrently stores contradictory knowledge for different users.

16. A device for processing a language selected by a user, comprising:
   an input interface configured to receive input data in the form of utterances in a formal, naturalistic, speakable, hybrid language, wherein the formal, naturalistic, speakable, hybrid language is characterized by having a completely defined set of non-ambiguous grammar rules and excludes natural languages;
   a processing circuit adapted to implement
      a parsing module adapted to parse the input data from the input module into an internal format;
      a prover module adapted to receive the formatted input data from the parse module and comparing the parsed input data with previously stored data in a data/knowledge base according to non-statistical, logic operations to prove, disprove or determine if the parsed input data is plausible; and
   a memory device configured to store results of the prover module in the data/knowledge base, wherein the input data is obtained from a plurality of different users and the data/knowledge base stores knowledge while recognizing, maintaining, and storing distinct realities for different users;
   wherein in reply to a question, the processing circuit further generates one of an auditory or visual response at the processing device in the formal, naturalistic, speakable, hybrid language based on accumulated knowledge of the data/knowledge base,
   wherein for the same question, a first auditory or visual response for a first user is contradictory to a second auditory or visual response for a second user if the first and second users have different realities.

17. The device of claim 16, wherein the prover module is configured use the non-statistical, logic operations to prove the statements, disprove the statements or show that the meaning of the statements are plausible and saves in the data/knowledge base.

18. A method operational in a processing device, comprising:

inputting data into the processing device in a formal, naturalistic, speakable, hybrid language, wherein the formal, naturalistic, speakable, hybrid language is characterized by having a completely defined set of non-ambiguous grammar rules and excludes natural languages;

parsing the input data at the processing device into an internal format in such a way that a memory of an original grammar structure present in the input data is retained;

comparing the parsed input data with previously stored data in a data/knowledge base according to non-statistical, logic operations to prove, disprove or determine if the meaning of the parsed input data is plausible;

storing results of the evaluation in the data/knowledge base, wherein the input data is obtained from a plurality of different users and the data/knowledge base stores knowledge while recognizing, maintaining, and storing distinct realities for different users; and in reply to a question, generating one of an auditory or visual response at the processing device in the formal, naturalistic, speakable, hybrid language based on accumulated knowledge of the data/knowledge base, wherein the auditory or visual response to a first user includes contradictory realities from different users if first user does not have a stored reality with which to provide the response.

* * * * *